US010555517B2

(12) United States Patent
Pellenc et al.

(10) Patent No.: US 10,555,517 B2
(45) Date of Patent: Feb. 11, 2020

(54) SPRAYING UNIT, COMPACT SPRAYING MODULE INCLUDING SUCH A UNIT, AND SPRAYING AND CONTROL SYSTEM INCLUDING A PLURALITY OF SUCH MODULES

(71) Applicant: PELLENC (SOCIETE ANONYME), Pertuis (FR)

(72) Inventors: Roger Pellenc, Pertuis (FR);
Jean-Marc Gialis, Cheval Blanc (FR)

(73) Assignee: PELLENC SAS, Pertuis (FR)

( * ) Notice: Subject to any disclaimer, the term of this patent is extended or adjusted under 35 U.S.C. 154(b) by 70 days.

(21) Appl. No.: 15/739,225

(22) PCT Filed: Jun. 24, 2016

(86) PCT No.: PCT/FR2016/051561
§ 371 (c)(1),
(2) Date: Dec. 22, 2017

(87) PCT Pub. No.: WO2016/207571
PCT Pub. Date: Dec. 29, 2016

(65) Prior Publication Data
US 2018/0160670 A1    Jun. 14, 2018

(30) Foreign Application Priority Data

Jun. 25, 2015    (FR) ...................................... 15 55894

(51) Int. Cl.
*A01M 7/00*     (2006.01)
*B05B 3/10*     (2006.01)
(Continued)

(52) U.S. Cl.
CPC ........... *A01M 7/0014* (2013.01); *B05B 3/105* (2013.01); *B05B 3/1014* (2013.01);
(Continued)

(58) Field of Classification Search
CPC .... A01M 7/0014; B05B 3/1014; B05B 3/105; B05B 7/0081; B05B 7/0458; B05B 7/0466; B05B 7/0475; B05B 7/0815
(Continued)

(56) References Cited

U.S. PATENT DOCUMENTS

| 4,473,188 A | 9/1984 | Ballu |
| 4,609,145 A * | 9/1986 | Miller ................. A01M 7/0014 |
| | | 239/77 |

(Continued)

FOREIGN PATENT DOCUMENTS

| DE | 28 23 253 A1 | 5/1979 |
| FR | 2 497 439 A1 | 7/1982 |

(Continued)

OTHER PUBLICATIONS

International Search Report, dated Sep. 13, 2016, from corresponding PCT application No. PCT/FR2016/051561.

*Primary Examiner* — Steven J Ganey
(74) *Attorney, Agent, or Firm* — Young & Thompson

(57) ABSTRACT

Disclosed is a spraying unit intended for spraying a liquid onto vegetation and including: a nozzle formed by a tube, a rotatable atomizer, and a fan generating a carrying air flow around the atomizer, a drive system, and a transport unit for transporting the liquid to the atomizer, which is capable of breaking the liquid up into droplets. The nozzle encloses a body surrounded by the carrying air flow and including a rotatable portion formed by the rotatable atomizer, the rotation of which causes droplets in the carrying air flow to be propelled, preferably in a direction substantially perpendicular to the longitudinal axis. Also disclosed is a compact spraying module including such a unit and to a spraying and control system including a plurality of such modules.

30 Claims, 12 Drawing Sheets

(51) Int. Cl.
*B05B 7/00* (2006.01)
*B05B 7/04* (2006.01)
*B05B 7/08* (2006.01)

(52) U.S. Cl.
CPC .......... *B05B 7/0081* (2013.01); *B05B 7/0458* (2013.01); *B05B 7/0466* (2013.01); *B05B 7/0475* (2013.01); *B05B 7/0815* (2013.01)

(58) Field of Classification Search
USPC .................................. 239/77, 223, 224, 14.1
See application file for complete search history.

(56) References Cited

U.S. PATENT DOCUMENTS 4,795,095 A * 1/1989 Shepard .................. B05B 3/105
239/224
6,152,382 A * 11/2000 Pun ..................... A01M 7/0014
239/77
2011/0089258 A1 4/2011 Pun

FOREIGN PATENT DOCUMENTS

GB          893693 A    4/1962
JP       2010-036090 A   2/2010

* cited by examiner

SPRAYING UNIT, COMPACT SPRAYING MODULE INCLUDING SUCH A UNIT, AND SPRAYING AND CONTROL SYSTEM INCLUDING A PLURALITY OF SUCH MODULES

BACKGROUND OF THE INVENTION

Field of the Invention

The invention relates to the field of devices that project a liquid in the form of droplets mixed with a stream of carrier air onto a target that consists of, for example, a plant mat, and it has as its object a spraying unit. It also has as its object a compact spraying module that comprises such a spraying unit and a spraying and control system comprising a number of such modules.

Description of the Related Art

It can be applied in particular in the agricultural field for the treatment of field crops, tree farming, or wine-making. It will be described below for the sake of simplification in its application in the wine-making sector, requiring significant supplies of phytosanitary products. The supply of the latter in nature can generate over the more or less long term serious consequences on the health plane as on the ecological plane but also on the economic plane. These products are actually one of the primary sources of pollution of water, soil, and groundwater tables, and their inhalation and even their ingestion has irreversible consequences on the users' health. On the economic plane, apart from the high cost of products and their implementation, the ineffectiveness of a treatment can cause irreversible damage to the harvest.

In this context, over the past few years, public authorities have made the standards more stringent on treatment devices, imposing, for example in France, an obligatory technical monitoring of spraying devices every 5 years. Along another avenue, active materials identified as being the most dangerous are forbidden or their approved dose is reduced. It is clear that these standards will evolve continuously in the future and will therefore become even more stringent with regard to the regulatory situation of the machines and products. This evolution requires the design of new spraying machines making it possible to make judicious use of minimum doses of active material directed toward a specified plant target while limiting their energy consumption for preserving at the same time the environment, the health of the plants in question, but also that of the operators having to control such machines.

Known are multiple types of sprayers used in the wine-making industry for cover treatments or focused on the area of bunches of grapes, and in particular the following four types of sprayers: spray-jet, air-assisted, pneumatic and centrifugal.

All of these devices have in common projection onto the crushed vegetation (term used to define the liquid to be projected, generally consisting of a mixture of water and active material) that is transported in liquid form and under pressure in piping that ends in a spray nozzle. The pulp is micronized in droplets in the area of the nozzle and directed toward the vegetation by different means according to the technology of the spraying device. The nozzle comprises a calibrated jet, most often consisting of the opening formed in a small plate of slight thickness, this opening passing through the small plate that can have varied shapes (cylinder, prism, cone, . . . ) but of small size to be able to transform the pressurized liquid upstream into droplets downstream. The jet defines the flow rate of pulp that will be sprayed and the droplet size. This flow rate of pulp is not, however, controlled precisely because of depending in particular on the pressure conditions of the liquid upstream, different for each nozzle, because of being based on geometry and the length of piping between the pump and the nozzle, and the wear and tear over time on the jet due to the abrasion of its opening with passage of the products.

In the spray jet devices, in a general way comprising a number of nozzles for covering the zone to be sprayed, the pulp is transformed into droplets in the area of each nozzle by the combined effect of the pressure of the liquid upstream from the jet and the geometry of the jet, with this effect also communicating to said droplets a kinetic energy and a direction of their spraying. The droplets are thus projected directly into the ambient air generally in the form of a cone for spreading at a more or less large angle, depending also on the shape of the jet and the pressure of the pulp upstream from the latter. In contrast, the higher the pressure of the pulp, the higher the speed the droplets formed at the outlet of the jet will have, but then the smaller size they will be, limiting their kinetic energy and therefore their capacity to reach the leaves and the grapes, by adding the fact of their evaporation between the outlet of the nozzle and the targeted vegetation. The droplets can also be subjected to a significant drift from their path in the event of wind. It is also known in this type of device that a great variation in pressure generates only a small variation in flow rate, while making the droplet size vary significantly. This type of device then defines optimum operation between the pressure and the jet in the area of each nozzle that only allows little or no adjustment in the flow rate of pulp for spraying the targeted vegetation, i.e., the flow rate is not controlled upstream from the jet. The change in flow rate of pulp projected at the vegetation then makes it necessary to change all of the nozzles (or their jets) by human intervention that is long and labor-intensive and that requires that safety equipment be worn.

In the air-assisted devices, the pulp is always transported under pressure in the area of the nozzle with an effect similar to the spray jet devices. In this technology, however, a high-speed air stream (high flow rate of air at speeds on the order of 100 to 200 km/h) will surround the nozzle to carry the droplets to the vegetation, heightening the speed of the droplets to the targeted vegetation and promoting their penetration. This air stream is provided by a centralized ventilation system on the machine and will then be piped to each spray nozzle. Thus, with an air-assisted device, the droplet size is always determined by the combination of the pressure and the jet, but it is essentially the air stream in the area of the jet that will transport the droplets on a path that is oriented toward the targeted vegetation, by greatly reducing the sensitivity of said path to the influence of outside wind and by limiting the evaporation of the droplets during their travel.

However, in line with the spray jet technology, the flow rate in the area of each nozzle is given only by way of indication, is not controlled, differs from one nozzle to the next, and can vary only over a small flow rate range, requiring that the nozzles (or their jets) be changed to modify the flow rate of pulp to be sprayed. In addition, the air that is necessary to the composition of the air stream is generated in a centralized way and then distributed to the various nozzles through a circuit of long and complex piping generating significant losses of feedstock, air speeds that are different and not controlled from one nozzle to the next, as well as an overabundant energy consumption. The high-power turbines used here are in addition particularly noisy.

In contrast to air-assisted or spray-jet devices, the pneumatic devices form the droplets directly from an accelerated high-speed air stream in the area of the nozzle (generally from 300 to 500 km/h), called a spark gap here (often a simple jet). The pulp is brought under pressure into the area of the spark gap to form a vein of non-micronized liquid in the absence of an air stream. The high-speed air stream is accelerated in the area of the spark gap (for example, by Venturi effect) to generate the micronization of the liquid vein into droplets. The droplet size in such devices is linked to the speed of the air stream in close relation with the flow rate of the pulp in the area of the spark gap. A change in air speed is then always to accompany a change in flow rate and in a general way the jet of the spark gap, so as not to penalize the spraying quality. And conversely, a change in jet to modify the flow rate will also necessitate adapting the speed of the air stream. There also, the operating principle of these devices generates, like the technologies mentioned above, flow rates and air speeds that differ from one nozzle to the next resulting in the spraying in the area of the targeted vegetation, with a pulp flow rate that is given by way of indication and is not controlled. The generation of the air stream is also centralized there, a heavy consumer of energy and particularly noisy.

The major drawbacks of these first 3 technologies can be summarized as follows:
  The spraying parameters, such as, for example, the flow rate or the air speed, are given by way of indication in the area of each nozzle, differ from one nozzle to the next, and diverge over time owing in particular to the wear and tear on the jets. These systems therefore do not make it possible to monitor and control precisely these spraying parameters in the area of each nozzle, just as much as they do not make it possible to vary these parameters in a large range with the same nozzle to be adapted instantaneously to the vegetation encountered during treatment. Nevertheless, numerous factors such as the nature of the terrain, the age and the variety of grape of the vine, can lead to very different quantities of plant mass from one vine stock to the next that would require pulp flow rates that can be modified quickly and over significant ranges to adapt to the plant masses relative to the spraying nozzles. This point prompts the operator to instead position the calibrations (nozzles, jets, spark gaps) of the machines of the state of the art at their maximum flow rate so as to prevent losing time in changing them as much as is necessary, which then brings about an overabundant consumption of pulp. It therefore cannot be considered with these technologies to imagine dynamic variations of the spraying parameters on the vegetation encountered during treatment,
  The change in flow rate, the adjustment, the cleaning and the maintenance impose a long and labor-intensive human intervention that, taking into account the toxicity of the pulp, requires the use of individual protection and operating procedures that are very restrictive, and even impracticable (change in tens of nozzles or jets to modify a flow rate or to change the treatment product, cleaning of the tanks, and piping of pulp, . . . ),
  The fact that the jets are small in size in order to ensure the effectiveness of the micronization means that the pulp has a high dilution level of the phytosanitary products to keep them from becoming clogged up by pulp agglomerates that are poorly dispersed in water, thus making it impossible to work with small spreading volumes of pulp (less than, for example, 100 liters per hectare, whereas the standard volumes vary within a range on the order of 200 to 800 liters per hectare based on the vegetation and the type of pulp to be sprayed). Actually, the autonomy of the sprayer, taking into account the high level of dilution of the phytosanitary products, requires spraying units comprising large tanks of 1,000 to 2,000 liters of liquids, and consequently equivalent volumes of clear water. The weight of this unit requires powerful towing vehicles to combine the traction of the spraying unit and its operation,
  The pressures that are necessary in the area of the jets are high, meaning that the high-technology pumps are expensive, heavy and bulky and can easily reach values on the order of 30 bar, and demanding significant energy dissipated in the area of the pump,
  The generation of the air stream in the pneumatic or air-assisted technologies is done using a single large-diameter turbine, very noisy, generally combined with a network of flexible sheaths that entrain significant losses of feedstocks, requiring an oversizing of the turbine and actually power on the order of 30 kW entraining a more significant consumption of the towing vehicle. In addition, the turbine has a high inertia that generates a start and stop time of the former over a duration of several seconds, not making possible frequent stop and start sequences during the treatment (end of row, point, momentary absence of vegetation, maneuvering, . . . ), which then brings about a useless and polluting consumption of pulp and fuel.

The centrifugal technology, which is the most recent in this field, makes it possible to solve a portion of the problems posed by the three other above-mentioned technologies.

The document FR 2 497 439 has as its object a spraying installation using the centrifugal technology, in which the droplets are formed by a rotary nozzle of large diameter, on the central part of which a jet projects the pulp to be sprayed. A collector in the form of a ring sector, with a fixed or adjustable angle, is attached opposite the periphery of the rotary nozzle, without contact with it, in such a way as to intercept the pulp that is sprayed into the sector corresponding to the collector and to limit the spraying zone to the part corresponding to the free sector of the collector. The droplets are formed here by exploding due to the centrifugal force of the liquid vein of pulp when it arrives at the end of the nozzle in rotation. This rotary nozzle technology has the advantage of spreading small quantities of pulp, quantities that in the other technologies would require considerably reducing the size of jets to obtain a low flow rate of pulp, by thus increasing the risk of the former being clogged. While using the same jet and therefore a given flow rate of pulp entering the nozzle, the appropriate selection of the angle covered by the collector in ring sector form makes it possible to adjust a flow rate of pulp that is sprayed at the vegetation depending on the size of the open sector in the collector and therefore inevitably less than the flow rate of pulp entering the nozzle.

However, the installation of the document FR 2 497 439 has the following drawbacks:
  The portion of pulp not spread on the vegetation is normally recycled by the collector ring. However, a portion of this pulp is lost in an uncontrolled way by overflowing or draining of the recycled product from the collector, bringing about a loss of pulp and undesirable pollution of the environment. Thus, all of the pulp reaching the area of the jet is not directly and totally projected at the vegetation, The recycled pulp loses its characteristics because of its exposure to the atmosphere: the concentration of active products is modified because of a first spraying (by evaporation of water, for example); the pulp can be recycled several times before being spread on the vegetation. Thus, the quality of the pulp sprayed at the vegetation is not constant, The flow rate of pulp projected at the vegetation depends on the angle of opening of the free sector of the collector. It is therefore impossible to modify this flow rate on the same plant mat portion opposite the free sector, since only then will a larger plant mat portion be impacted by the opening of the free sector of the collector. The change in flow rate over an identical plant mat portion will then require the changing of the jet with the drawbacks of the above-mentioned technologies, The flow rate projected at the vegetation is given by way of indication and cannot be controlled precisely, taking into account losses and recycling of liquid mentioned above, The kinetic energy of the droplets for reaching the vegetation is generated only by the rotary nozzle. The drawbacks of the spray jet technology are thus shown.

Still in the centrifugal technology using rotary nozzles that have the effect of micronizing a liquid, i.e., a pulp in liquid form in droplets, the object of the document U.S. Pat. No. 6,152,382 is a modular spraying device that includes at least one spraying module that comprises an exhaust nozzle formed by a cylindrical tube that is open at its two ends, said exhaust nozzle generating a stream of carrier air generated by an axial fan positioned at one of its ends, said stream of carrier air acting at the outlet of the exhaust nozzle on a rotary nozzle, also known as a rotary atomizer, coming in the form of a conical part whose end goes beyond the outlet opening of the exhaust nozzle outside of the latter. Said stream of carrier air is, however, broken down into two laminar air streams, namely an axial laminar air stream around the rotary nozzle and oriented axially so as to distribute the pulp uniformly over a slight thickness of the conical part of the rotary nozzle and to communicate kinetic energy to the droplets generated by centrifuging at the end of the rotary nozzle in a predictable direction, and a helical laminar air stream organized around the axial laminar air stream, with the mixing of the two being performed between the outlet of the module and the plant mat, to make the droplets penetrate into all of the faces of the sheets of said plant mat. The pulp is transported in each module by an intake tube passing through the wall of the chamber of the corresponding module to emerge in the area of the conical outer surface of the rotary nozzle into a zone that is covered by the axial laminar air stream, from a central reservoir and by means of one or more pumps (one pump per ramp for spraying multiple modules) separated from the module that provides a flow rate that is given by way of indication in the area of each module as well as flow rate conditions that are similar from one module to the next. The flow rates in the area of each module are therefore not controlled and cannot be modulated in ranges that essentially differ from one module to the next.

In addition, with the type of device disclosed by the document U.S. Pat. No. 6,152,382, the pulp arrives on the conical surface of the rotary nozzle that is surrounded by the axial laminar air stream generating a draining by a combination of the effect of gravity and the suction generated by the axial laminar air stream in the area of the intake tube, followed by a pick-up of large drops in the axial laminar air stream, and even passing through the two successive laminar air streams to end outside of the targeted plant surface. Furthermore, the vortex effect of the helical laminar air stream makes the path of the droplets between the outlet of the module and the plant significantly longer, increasing the risk of the droplets drying during this travel, with the latter actually quickly losing the energy that is necessary for reaching the targeted plant. However, also, the means developed for generating each stream of air in a laminar way in the form of two sets of multilayer channels considerably increase the friction surface between the air and these channels and therefore the losses in feedstock inside the module, where the former are also heightened in the shearing zone of air generated at the interface between the two laminar air streams, outside of the module during the mixing between the two laminar air streams, but also during their interaction with ambient air at the module outlet. The electrical yield of the system is thus seriously affected. This system especially requires the installation of two motors per module to generate, on the one hand, the two laminar air streams, and, on the other hand, the micronization of the pulp, which has the result of increasing the weight, the space requirement, and the complexity of managing the system. Finally, the installation of solenoid valves at some distance from the module making it possible to distribute the pulp that arrives on the rotary nozzle does not make it possible, in the event that the supply of the pulp is cut off, to stop instantaneously the production of drops or droplets, taking into account the direct interaction of the axial laminar air stream on the arrival of pulp from the rotary nozzle and the inevitable suction by the axial laminar air stream of the quantity of pulp located between the solenoid valve and the end of the intake tube.

BRIEF SUMMARY OF THE INVENTION

This invention has as its object to remedy at least one of these drawbacks by proposing a spraying unit provided for the purpose of receiving a liquid with a controlled variable flow rate and the suction of ambient air to generate a stream of carrier air that can project at the outlet or downstream from the unit for spraying said air stream mixed with said liquid in the form of droplets at a target, with a high dynamic, an excellent energy yield, and a very low environmental impact.

Liquid with a controlled variable flow rate is defined as the flow rate of a liquid obtained from a reservoir and provided by a liquid supply system under the control of and/or monitoring by an electronic intelligence, for example an electronic control and monitoring unit that operates on the basis of a microprocessor, making it possible to adjust a given flow rate according to a corresponding flow rate target and this independently of the pressure in the hydraulic circuit.

Very low environmental impact is defined as the fact of being able to prevent the projection of pulp outside of the targeted vegetation, being able to spray the exact quantity of pulp by adapting during the spraying the pulp flow rate in a controlled manner based on the targeted vegetation, avoiding any loss of pulp through drainage on the ground, being able to stop the spraying of pulp instantaneously in the absence of vegetation, being able to limit the consumption of clear water for the pulp, or the cleaning of the system, and finally limiting in a drastic way the energy that is necessary to the spraying operation.

For this purpose, the spraying unit, according to this invention, for the spraying of a liquid in droplet form for the treatment of a target, such as, for example, a plant row, with said spraying unit comprising an exhaust nozzle formed by a pipe that extends along a longitudinal axis by delimiting on the inside a main inner space and being open at its ends to form an air inlet opening and an air outlet opening, the main inner space accommodating at least one rotary atomizer mounted in rotation around a first axis of rotation, transporting means for transporting the liquid, coming from a supply system with a controlled variable flow rate, up to the rotary atomizer, a fan that comprises at least one propeller mounted in rotation around a second axis of rotation and making it possible to generate a stream of carrier air in the main inner space at and beyond the air outlet opening and an electric motor drive system making it possible to ensure the driving in rotation of said rotary atomizer and propeller, with said rotary atomizer comprising a receiving surface that is provided for the purpose of receiving the liquid and ensuring, on its periphery or its end, in the state of rotation of said rotary atomizer, the breaking-up of liquid into droplets and their propulsion into the stream of carrier air, and means for connecting to an electrical energy source for providing electrical energy to the drive system, is characterized essentially in that it also comprises an inner fuselage that has an aerodynamic profile defined by a lateral surface delimiting on the inside a secondary inner space and being kept axially in the main inner space between the fan and the air outlet opening in such a way as to define, between the fuselage and the exhaust nozzle, an annular channel for circulation of the stream of carrier air surrounding said fuselage, in that the fuselage comprises a rotary section that is formed by the rotary atomizer in such a way that the periphery or the end of the receiving surface essentially is part of the lateral surface of the fuselage while making possible the rotation of the rotary atomizer and the propulsion, preferably essentially perpendicular to the longitudinal axis, of said liquid in the form of droplets in said channel to be incorporated in the air stream [sic].

This invention also has as its object a compact spraying module for the spraying of a liquid in the form of droplets for the treatment of a target, such as, for example, a plant row, being characterized essentially in that it comprises:

A spraying unit as defined according to the invention,
A liquid supply system functionally connected to the transporting means of said spraying unit, with said supply system comprising an electric pump, preferably a volumetric pump, more preferably a peristaltic pump, if necessary combined with a flow rate sensor, making it possible to push back, at a controlled variable flow rate, the liquid that comes from a reservoir, in said transporting means, and a connecting interface making it possible for said system to receive the liquid that comes from the reservoir,
A support that makes it possible to keep the electric pump steady close to the spraying unit,
An electronic control and/or monitoring unit, for example implanted on an electronic card, provided for the purpose of controlling and/or monitoring the operation of the drive system and the liquid supply system by being functionally connected to said drive system and liquid supply system,
An electric connecting interface making possible the connection of the drive system, the electronic control and/or monitoring unit, and the liquid supply system to an electrical energy source to ensure their electrical supply.

Such a spraying module can also be provided for the purpose of being connected in a spraying and control system comprising a number of spraying modules and a central control unit. For this purpose, the module can also comprise a communication interface making it possible to connect the electronic control and/or monitoring unit to the central unit, so as to make remote individual control of said module possible, independently of other modules, to be able to adapt at least one spraying parameter instantaneously.

Finally, this invention also has as its object a spraying and control system designed to be installed on board a machine or a movable unit, with said system comprising a number of spraying modules for the spraying of a liquid in droplet form for the treatment of a target such as, for example, a plant row, with said liquid coming from a reservoir, being characterized essentially in that it also comprises a control panel comprising an electronic central control unit, a man-machine interface, so-called MMI, connected to the latter, with each spraying module consisting of a compact spraying module as defined according to this invention and in that the electronic central control unit is functionally connected to each spraying module in such a way as to make remote individual control of each spraying module possible, independently of the other spraying module(s), from said control panel to adjust individually the spraying and operating parameters of each spraying module.

In such a spraying and control system according to the invention, the control panel can also comprise at least one input interface that can receive signals from sensors of a detection system, such as a representative signal of the presence or the absence of a target, or of parameters characterizing said target, or else parameters provided by the towing vehicle such as its speed or its acceleration.

BRIEF DESCRIPTION OF THE DRAWINGS

The invention will be better understood owing to the description below, which relates to a preferred embodiment, provided by way of non-limiting example and explained with reference to the accompanying diagrammatic drawings, in which.

DETAILED DESCRIPTION OF THE PREFERRED EMBODIMENTS

Figure 1:
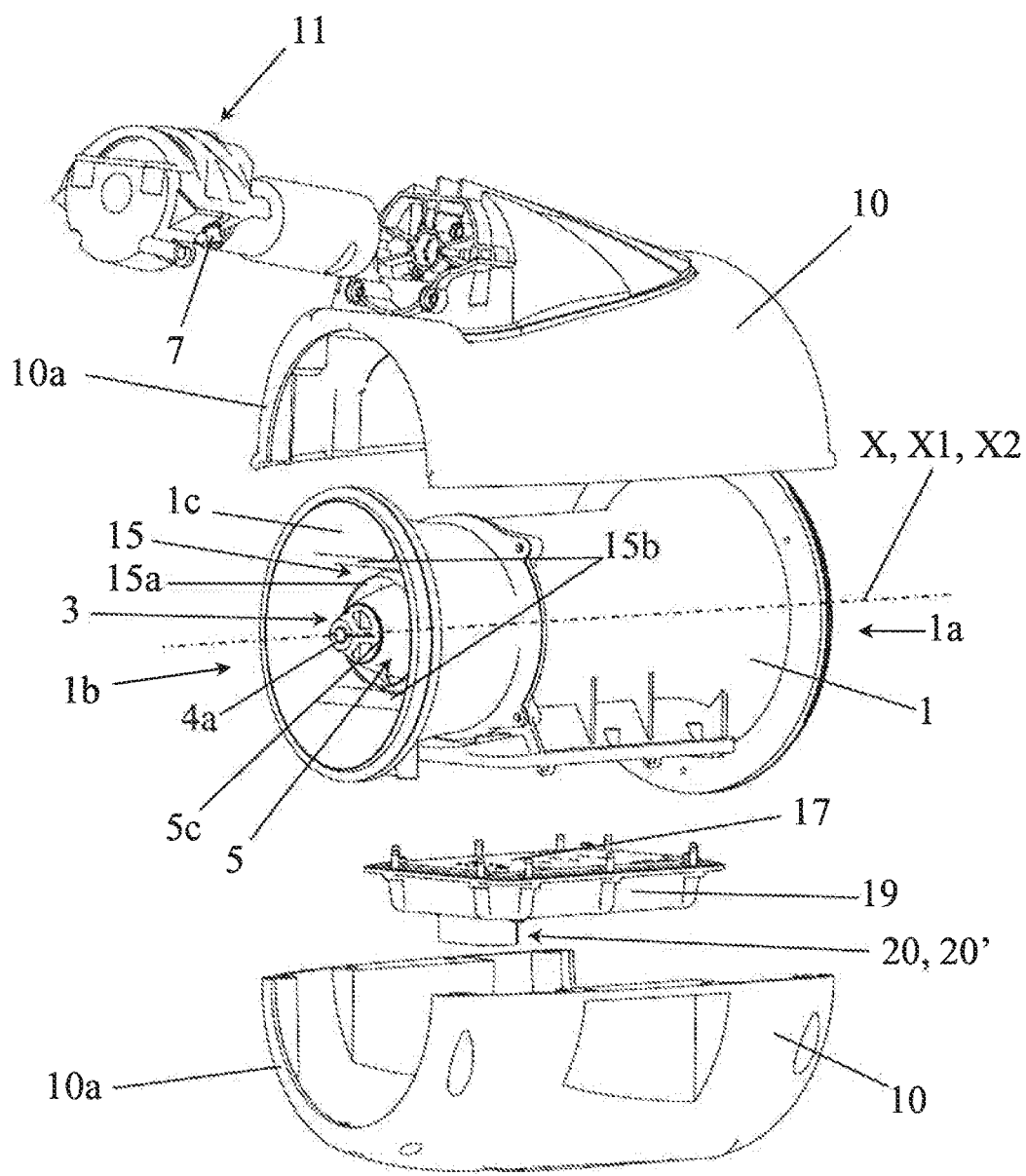
FIG. 1 shows a perspective and exploded view of a module according to the invention comprising a spraying unit according to the invention, in the mounted state of the latter, with an atomizer such as a rotary atomizer in a first embodiment of the latter.

In the accompanying figures, it is possible to see a spraying unit for the spraying of a liquid 18 in the form of droplets 18a for the treatment of a target 21, such as, for example, a plant row, said spraying unit comprising an exhaust nozzle 1 formed by a pipe extending along a longitudinal axis X by delimiting on the inside a main inner space 1c and being open at its ends for forming an air inlet opening 1a and an air outlet opening 1b. The main inner space 1c accommodates at least one rotary atomizer 3 mounted in rotation around a first axis of rotation X1, transporting means 8, 9 for transporting the liquid, coming from a supply system with a controlled variable flow rate, up to the rotary atomizer 3, a fan 2 that comprises at least one propellor 2a mounted in rotation around a second axis of rotation X2 and making it possible to generate a stream of carrier air in the main inner space 1c toward and beyond the air outlet opening 1b, and a drive system 4, 4a with electric motor(s) making it possible to ensure the driving in rotation of said rotary atomizer and propeller. The rotary atomizer 3 comprises a receiving surface 3a that is provided for the purpose of receiving the liquid at a controlled variable flow rate and ensuring, on its periphery or its end 3b, in the state of rotation of said rotary atomizer, the breaking-up of all of said liquid received in droplets propelled by centrifugal action into the stream of carrier air, and means 6 for connecting to an electrical energy source 22 to provide electrical energy to the drive system 4, 4a.

The liquid 18 is also commonly called pulp in the wine-making trade.

Figure 11:
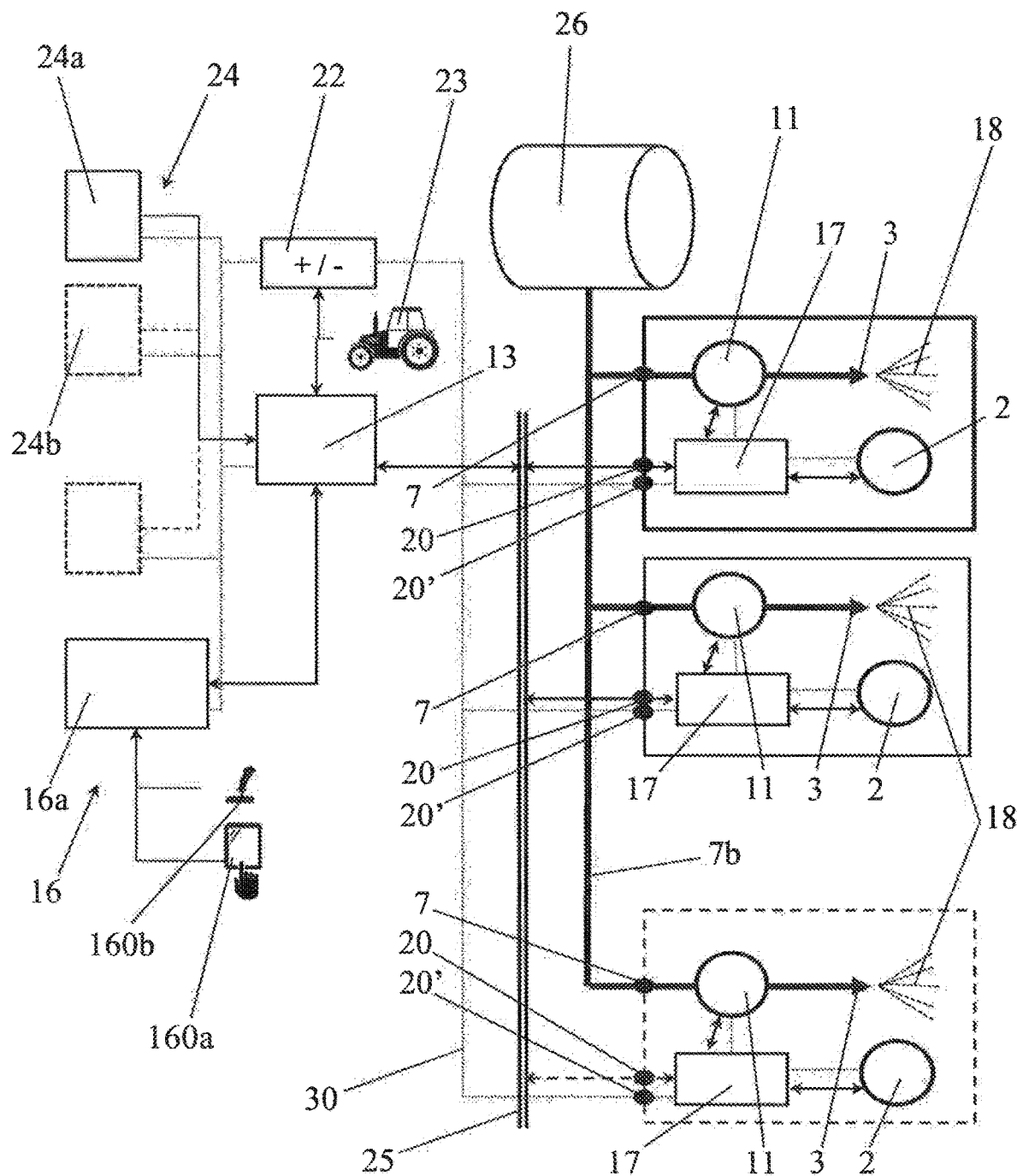
FIG. 11 shows a functional diagram of the spraying and control system according to the invention.

The electrical energy source 22 can consist of, for example, an electric generator coupled to a movable unit 23 such as a towing vehicle, with the energy being distributed by an electrical supply network 30 (FIG. 11).

In accordance with this invention, such a spraying unit also comprises an inner fuselage 5 that has an aerodynamic profile defined by a lateral surface 5a that delimits on the inside a secondary inner space 5b and that is held essentially coaxially in the main inner space 1c between the fan 2 and the air outlet 1b in such a way as to define, between the fuselage 5 and the exhaust nozzle 1, an annular channel for circulation of the stream of carrier air that surrounds said fuselage.

Still in accordance with this invention, the fuselage 5 comprises a rotary section formed by the rotary atomizer 3 in such a way that the periphery or the end 3b of the receiving surface 3a essentially is part of the lateral surface of the fuselage 5 while making possible the rotation of the rotary atomizer 3 and the propulsion by centrifugal action, preferably in a direction that is essentially perpendicular to the longitudinal axis X, of droplets into said channel to be incorporated into the air stream.

The fuselage 5 comprises a rotary section formed by the rotary atomizer 3 in such a way that the periphery or the end 3b, preferably smooth, of the receiving surface 3a essentially is part of the lateral surface of the fuselage 5 while making possible the rotation of the rotary atomizer 3 and the propulsion, preferably essentially perpendicular to the longitudinal axis X, of droplets in said channel.

Such an annular channel for circulation of the air stream can then concentrically surround the fuselage 5 along the longitudinal axis X of the exhaust nozzle 1.

The transporting means 8, 9 that receive the liquid to supply the rotary atomizer 3 in the spraying unit can be provided for the purpose of being connected to a liquid supply system 7, 11, 8, 9, which can comprise an electric pump 11 and a hydraulic connecting interface 7 that makes it possible for the latter to receive the liquid that is contained in a reservoir 26 (FIGS. 1, 2, 9, 11).

In the state of operation of the spraying unit, the rotary atomizer 3, more particularly the periphery or the end 3b of the rotary receiving surface 3a, can thus be entirely surrounded by the stream of carrier air generated by the fan 2 in such a way as to be able to project all of the droplets into the annular channel for circulation of the stream of carrier air and at variable distances between the fuselage 5 and the exhaust nozzle 1 based on the size and the geometry of the droplets, picked up on the periphery 3b of the rotary atomizer 3 (see in particular FIGS. 1, 2, 4a, 4b, 5, 9), which has the effect of ensuring their homogeneous mixing in said air stream that will then carry them toward the target (for example, the vegetation) in the form of a treatment brush. The rotary atomizer 3 can be placed near the air outlet opening 1b.

Thus, the fact that the periphery or the end 3b of the receiving surface 3a of the rotary atomizer 3 is part of the lateral surface of the fuselage and that the rotary atomizer 3 forms a part or a movable section of the fuselage 5 with an aerodynamic profile makes it possible, on the one hand, to promote the flow of the stream of carrier air around the rotary atomizer 3 by limiting the number of obstacles in the stream of carrier air as well as the turbulence generated by the latter at the outlet of the exhaust nozzle 1, and, on the other hand, to facilitate the incorporation of the droplets in the stream of carrier air to carry them to the target 21. The absence of a deposit or drops of liquid on the inner wall of the exhaust nozzle 1 at the module outlet also makes it possible to verify the integration of all of the droplets in the stream of carrier air.

It will be noted that the fuselage 5, outside of the rotary section formed by the rotary atomizer 3, can be made of several parts or sections that are assembled with one another, preferably in a removable or detachable manner, for example by being able to access different elements contained in the secondary inner space 5b of the fuselage 5 so as to carry out their changing or their maintenance.

The propeller 2a of the fan 2 generates the stream of carrier air during its rotation and by suction of ambient air through the air inlet opening 1a.

Preferably, the first and second respective axes of rotation X1, X2 of the rotary atomizer 3 and the propeller 2a can be combined or essentially combined, and, preferably, combined or essentially combined with the longitudinal axis X of the exhaust nozzle (FIGS. 2, 3, 4a, 4b). This characteristic is advantageous for limiting the space requirement of the exhaust nozzle in the plane that is perpendicular to the common axis.

Preferably, the drive system 4, 4a can be housed in the secondary inner space 5b of the fuselage 5, so as to prevent the stream of carrier air from being disrupted by the drive system 4, 4a.

The drive system 4, 4a can comprise at least one electric motor 4, preferably a motor without brushes, so-called brushless motor, and at least one drive shaft 4a making it possible to drive in rotation the rotary atomizer 3 around the first axis of rotation X1 and the propeller 2a around the second axis of rotation X2 (FIGS. 2, 3, 4a, 4b).

Figure 2:
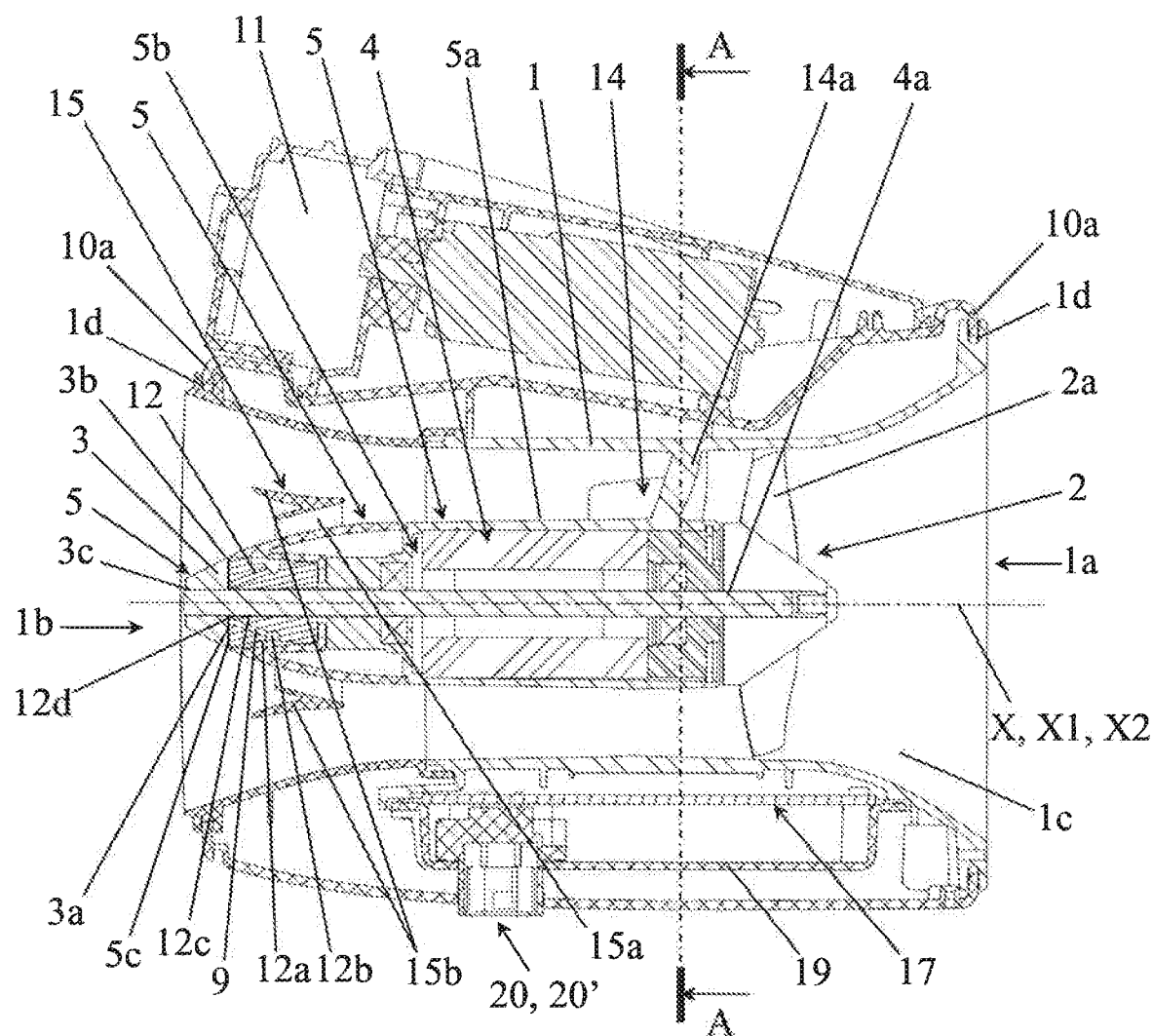
FIG. 2 shows a longitudinal cutaway view of the module shown in FIG. 1 in the mounted state.
Figure 3:
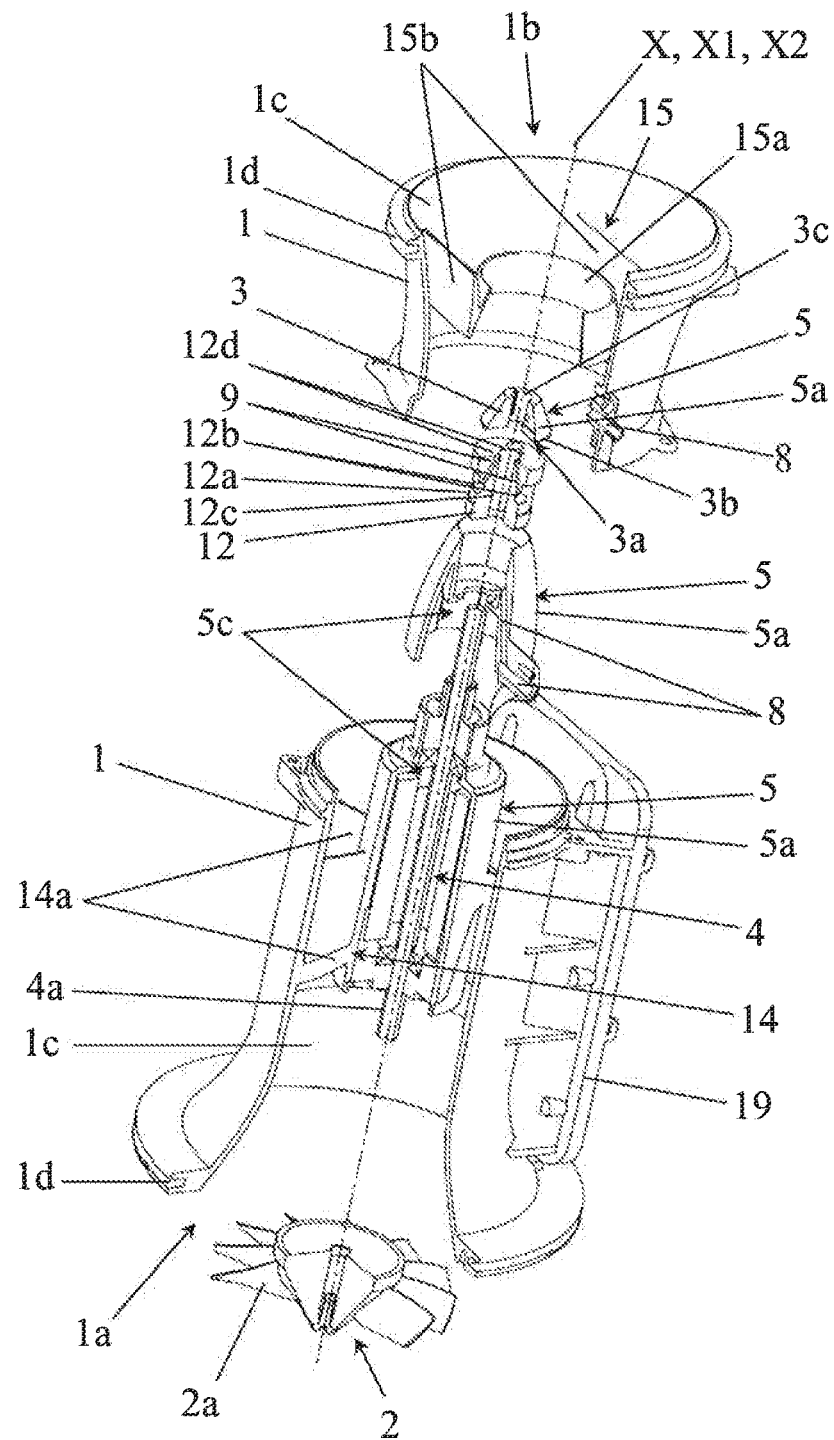
FIG. 3 shows a partial perspective and partial exploded view of the spraying unit shown in FIG. 1 in the unmounted state.
Figure 4A:
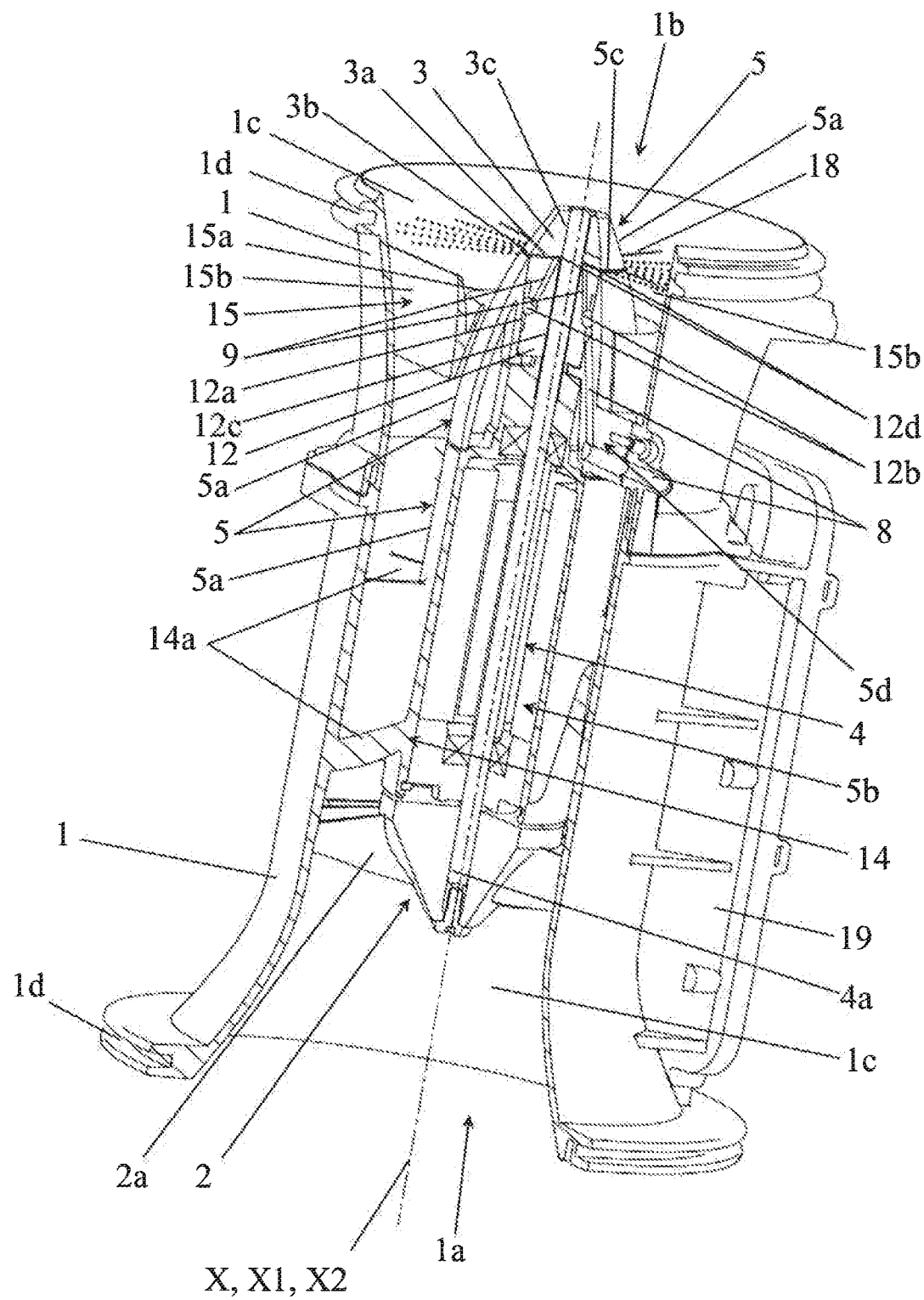
FIG. 4a shows a partial perspective view of the spraying unit shown in FIG. 3 in the mounted state, with the exhaust nozzle and the fuselage shown partially in such a way as to make the main inner space of the exhaust nozzle and the secondary inner space of the fuselage appear.
Figure 4B:
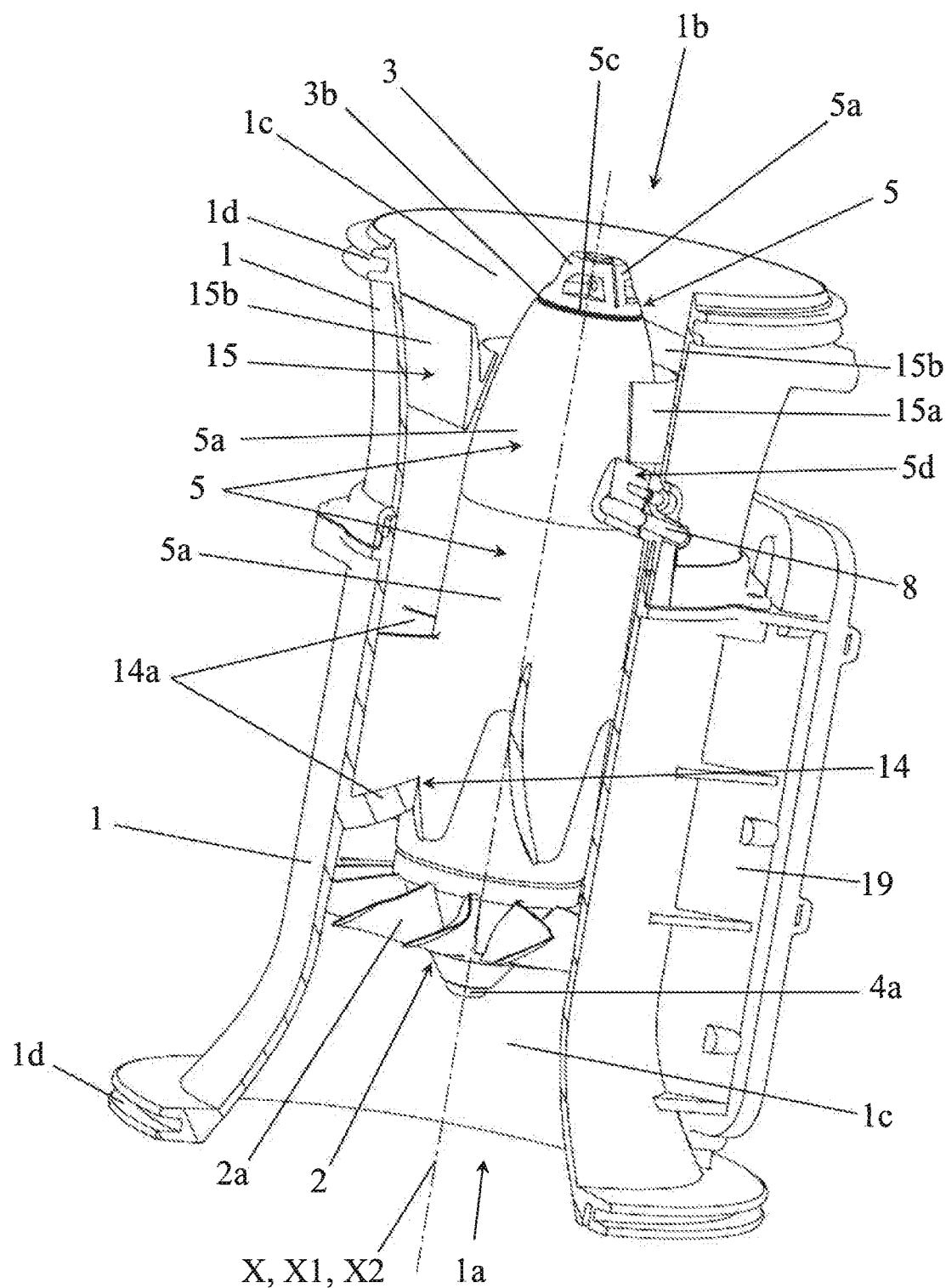
FIG. 4b shows the spraying unit shown in FIG. 4a, with the fuselage 5 in its entirety.

Preferably, as can be seen in FIGS. 2, 3, 4a, the drive system can comprise a single common electric motor 4 and a single common drive shaft 4a actuated in rotation around its axis X1, X2 by said electric motor. In addition, the common electric motor 4 and drive shaft 4a can make it possible to ensure both the rotation of the propeller 2a around the second axis of rotation X1 and the rotation of the rotary atomizer 3 around the first axis of rotation X2. The first and second axes of rotation X1, X2 can then be combined in such a way as to reinforce or to improve the compactness of the spraying unit along this axis and the outlet of the spraying module according to the invention described below. The applicant carried out numerous tests showing that the range of variation of the rotation speed of the propeller 2a that generates the stream of carrier air, combined with the droplet size produced by the rotary atomizer 3 in this range, exhibited satisfactory adjustment characteristics and no common measurement with the existing technologies. Thus, the embodiment based on a drive system with a common electric motor has the effect of simplifying the embodiment and the management of the module while increasing its compactness and its reliability. It was also demonstrated that the rotary atomizer had the capacity of transforming into droplets a liquid flow rate that can vary over a very wide range, without a common measurement there also with the existing solutions, and all of the droplets being mixed in this case in a fairly homogeneous way in the air stream without a noticeable loss of liquid through drainage. In addition, in the tests conducted in the wine-making industry, the applicant noted very significant savings in energy consumption compared to the main technologies used to date.

More particularly, if necessary, the brushless motor exhibits advantages of a fast rotation speed, preferably more than 15,000 rpm, with a low inertia to ensure fast changes in rotation speed and a low weight.

The fuselage 5 can comprise at least one cooling section surrounding the electric motor or motors 4 and being in contact with the stream of carrier air for evacuating through said contact a portion of the heat generated by the electric motor or motors. The or each section can be made of aluminum or another material promoting cooling or limiting heating of the electric motor or motors 4 placed in this fuselage section 5.

Figure 5:
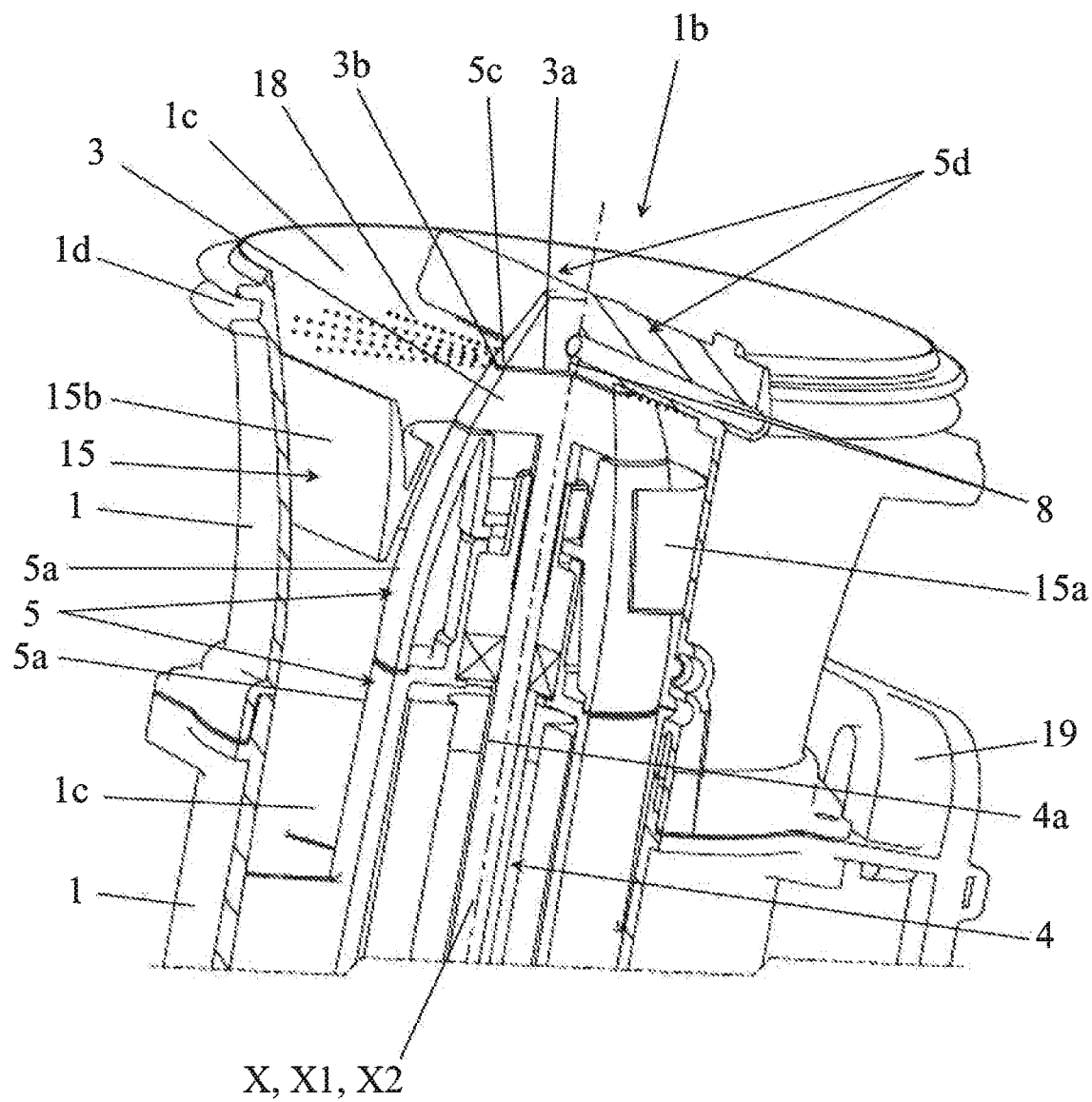
FIG. 5 shows a perspective view of the spraying unit shown in FIG. 4, in the area of its distal end comprising the air outlet opening, and in a second embodiment of the rotary atomizer.

The receiving surface 3a of the rotary atomizer 3 can extend into a plane that is essentially perpendicular to the longitudinal axis X of the exhaust nozzle 1, so as to be able to eject the droplets in a direction that is essentially perpendicular to the longitudinal axis X of the exhaust nozzle 1 and at different distances between the fuselage and the exhaust nozzle according to their shape and their weight where they will then be diverted by the stream of carrier air to be incorporated in an essentially homogenous way with the latter, as FIGS. 4a and 5 show in a theoretical way and that do not in this case take into account the pick-up and diversion of them by the stream of carrier air.

In a preferred embodiment, the rotary atomizer 3 can have overall the shape of a disk or a truncated or conical part, and at least one of the outer faces of the disk or the truncated or conical part can form the receiving surface 3a (FIGS. 2, 3, 4a, 5, 6).

The section of the fuselage 5 and/or the exhaust nozzle 1 can be variable, in dimensions and/or in shape, along its longitudinal axis, as can be seen in FIGS. 2, 3, 4a, 4b and 5. For example, the section of the exhaust nozzle 1 can be provided for the purpose of being enlarged in the area of its air inlet opening 1a and air outlet opening 1b. Preferably, the air outlet opening 1b can have an oval shape. Thus, the droplet brush obtained at the outlet of the exhaust nozzle can have an oval and essentially flattened shape in the area of the vegetation. Such an oval shape is particularly effective for obtaining a homogeneous brush, in combination, if necessary, with the diffuser device 15.

The rotary atomizer 3 can be pierced centrally and axially by a bore 3c for making possible the passage of the drive shaft 4a making possible its rotation around the first axis of rotation X1 (FIGS. 2, 3, 4a, 6) via a drive connection, such as, for example, a connection by pins, keys, grooves or teeth, or, as can be seen in FIGS. 1, 3, 4a, 4b, 6, by pinching or wedging on the drive shaft 4a or fitting the latter by force into the bore 3c. The drive shaft 4a can also be provided in a variant by being made of a single part with the rotary atomizer 3 (FIG. 5).

In a preferred embodiment of the transporting means 8, 9, it is possible to see, in particular in FIGS. 3, 4a, 4b and 5, that the former can comprise a main feed pipe 8 provided for the purpose of receiving the liquid coming from the liquid supply system 7, 11 and for the purpose of supplying with liquid, directly or indirectly, at at least one supply point, the rotary receiving surface 3a. In addition, the fuselage 5 can comprise a lateral liquid supply extension 5d that can have an aerodynamic profile and in which at least a portion of the main feed pipe 8 that is integrated or connected in said extension can pass. The lateral liquid supply extension 5d can be provided for the purpose of being able to extend transversely, preferably essentially perpendicularly, to the longitudinal axis X of the exhaust nozzle 1 in the annular channel for circulation of the stream of carrier air.

If reference is made to FIGS. 2, 3, 4a, 6 and 7, it is possible to see that in the case where such a main feed pipe 8 is provided for the purpose of supplying the receiving surface 3a with liquid indirectly, the invention can provide that the transporting means 8, 9 can also comprise for this purpose at least two secondary feed pipes 9, each provided for the purpose of being connected to said main feed pipe 8 and being located in the secondary inner space 5b of the fuselage 5. The spraying unit can also comprise an intermediate part for supply and distribution 12 that can comprise the secondary feed pipes 9 and that can be placed in the secondary inner space 5b of the fuselage 5 between, on the one hand, the fan 2, if necessary the electric motor 4, and, on the other hand, the rotary atomizer 3, in immediate proximity to the latter in such a way that each secondary feed pipe 9 can emerge separately from the stream of carrier air facing it and in immediate proximity to the receiving surface 3a to supply it with liquid at at least two supply points, preferably distributed on both sides of the first axis of rotation X1, if necessary on both sides of the drive shaft 4a that makes it possible to ensure the rotation of the receiving surface 3a around the first axis of rotation X1.

The high-speed rotation of the rotary atomizer 3, and exiting from its receiving surface 3a, has the effect of distributing, outside of the stream of carrier air, the liquid received by the latter, up to the periphery or the end 3b of said receiving surface 3a, i.e., up to the or one of the edges forming its periphery or its end, where the liquid will be broken up into droplets that will then be projected immediately by centrifugal action into the stream of carrier air that surrounds the rotary atomizer 3 and in particular the periphery or the end of its rotary receiving surface 3a.

If reference is made again to FIGS. 2, 3, 4a, 6 and 7, it is possible to see that the intermediate part for supply and distribution 12 can comprise an annular groove 12a for distribution of the liquid that can comprise at least two openings 12b that each emerge into one of the secondary feed pipes 9. In addition, the main feed pipe 8 can be provided for the purpose of emerging into the annular groove 12a that can thus ensure the distribution of liquid, transported from the electric pump 11 via the main feed pipe 8, into the secondary feed pipes 9.

Figure 6:
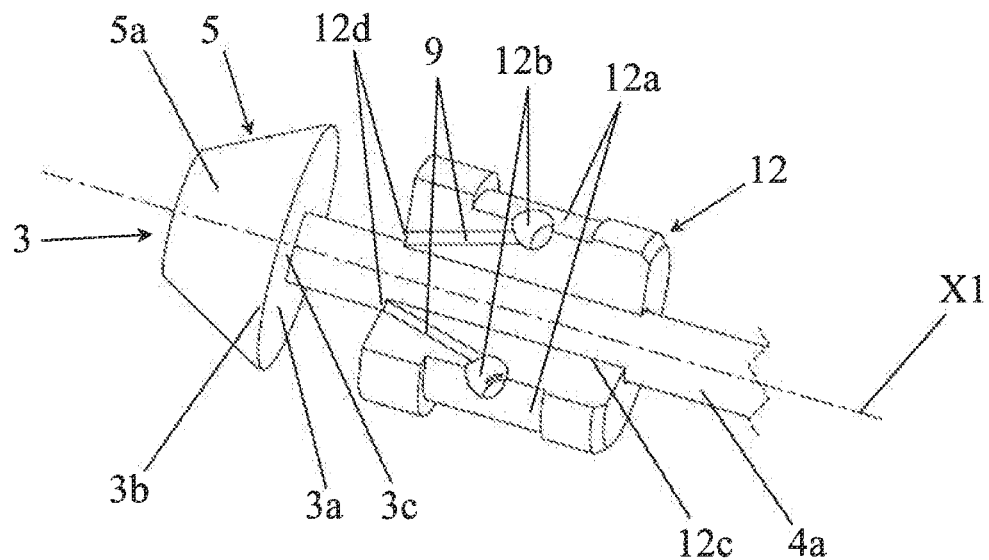
FIG. 6 shows a perspective view, with a partial cutaway, of the supply and distribution part and a perspective view of the rotary atomizer, through which the common drive shaft runs axially and which is shown in FIG. 3.
Figure 7:
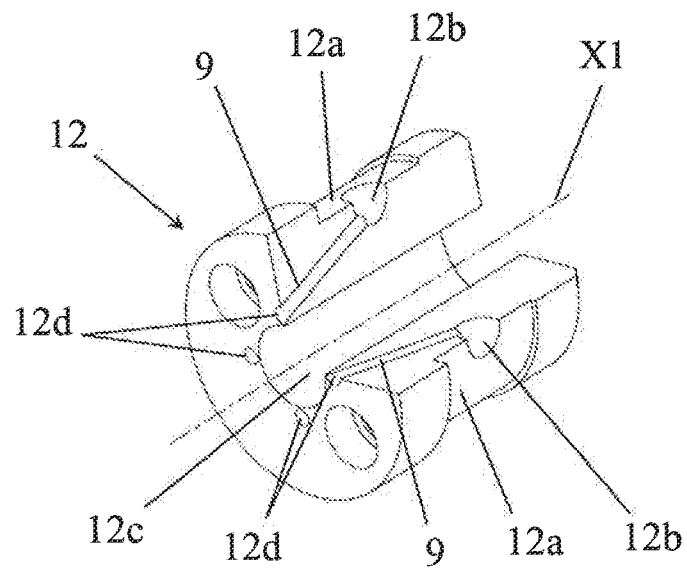
FIG. 7 shows only the supply and distribution part, shown in FIG. 6, from the side of its end comprising the supply openings.
Figure 8:
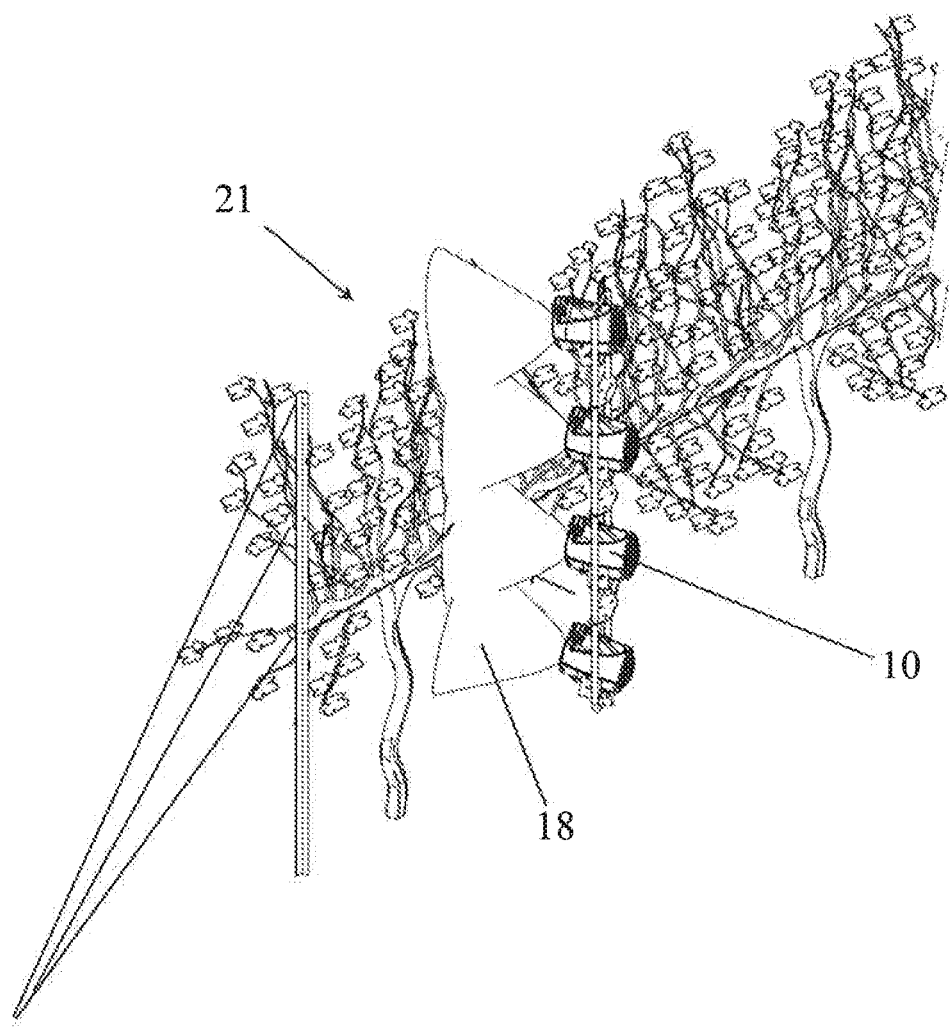
FIG. 8 shows a perspective view of a ramp of multiple modules of a spraying and control system of the module type shown in FIG. 1.
Figure 9:
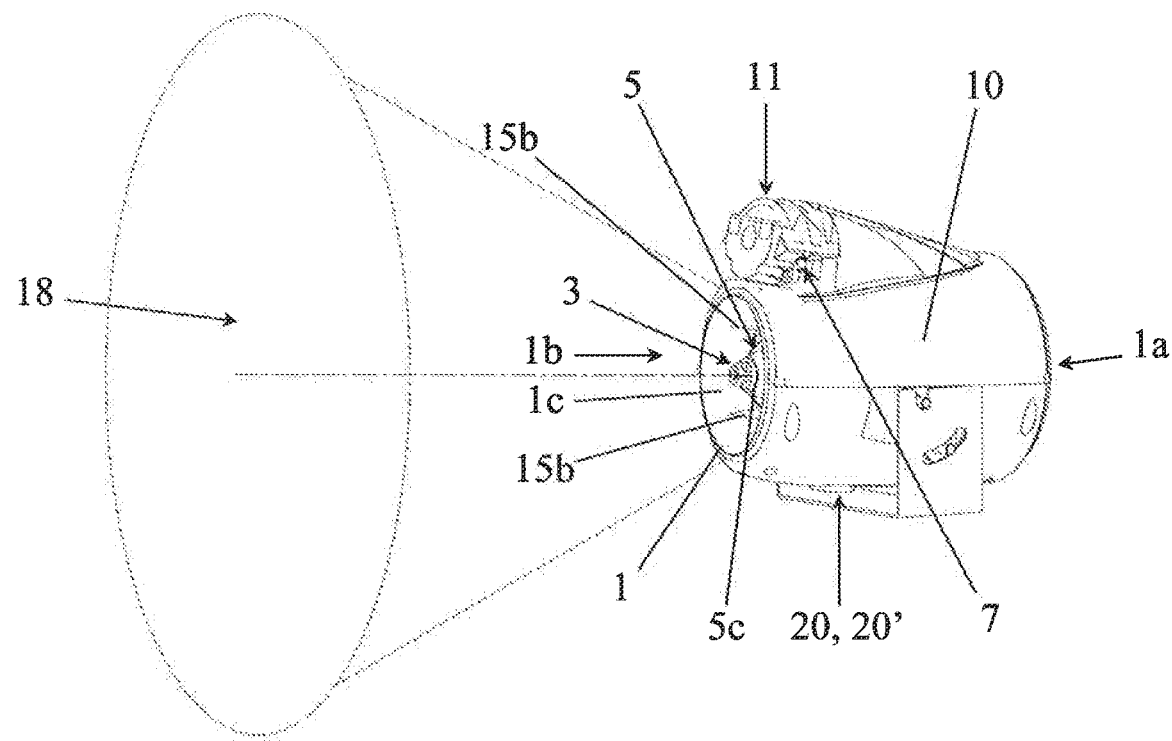
FIG. 9 shows a perspective view of the module shown in FIG. 1 in the mounted state and of the spraying of the liquid in the form of a droplet brush.

Preferably, as can be seen in particular in FIGS. 6 and 7, the intermediate supply and distribution part 12 can have an overall cylindrical shape and can be pierced at one of its end faces, which can be oriented, for example, by being rotated toward the air inlet opening 1a or air outlet opening 1b of the exhaust nozzle 1, through at least two feed holes 12d respectively forming the liquid supply points. In addition, the annular distribution groove 12a can be made in the outer lateral face of the supply and distribution part 12, and the secondary feed pipes 9 can be made of the same material as the intermediate supply and distribution part 12 in such a way as to emerge at one of their ends into the annular groove 12a and at their other end into one of said feed holes. In contrast, the fuselage 5 can be designed in its part receiving the intermediate supply and distribution part 12 to surround the annular groove by ensuring a fluid sealing with the latter.

A passage bore 12c that allows the passage of the drive shaft 4a, which drives in rotation the rotary atomizer 3 (FIGS. 2, 3, 4a, 6 and 7), can run through the intermediate supply and distribution part 12 axially by means of a drive connection, not shown.

The fuselage 5 extends longitudinally or axially between two ends, one of which, so-called distal end, is, in the mounted state in the exhaust nozzle 1, the farthest from the fan 2 or the closest to the outlet opening 1b, and the other, so-called proximal end, is the farthest from the outlet opening 1b. In a preferred embodiment of the axial or longitudinal position of the rotary section of the fuselage 5 formed by the rotary atomizer 3, the invention can provide that the rotary section can form the distal end of the fuselage 5 (FIGS. 1, 2, 3, 4a, 4b, 5, 9).

As can be seen in FIGS. 1, 2, 3, 4a, 4b and 5, the lateral surface 5a of the fuselage 5 can be closed or perforated, and can be continuous or discontinuous. Preferably, so as to obtain an increased effectiveness of the flow of the air stream along the fuselage 5 at least up to its rotary section formed by the rotary atomizer 3, the lateral surface 5a can be closed, i.e., continuously, along the fuselage 5 at least between, on the one hand, its proximal end, and, on the other hand, the rotary atomizer 3 or a zone located close to the latter.

In a first embodiment of the fuselage 5, as can be seen in FIGS. 1, 2, 3, 4a, 4b, 9, the receiving surface 3a of the rotary atomizer 3 can be located in the secondary inner space 5b, and the axial or longitudinal continuity of the lateral surface 5a of the fuselage 5 can be interrupted by a transverse passage slot 5c that makes possible the propulsion of droplets into the stream of carrier air through the lateral surface 5a of the fuselage 5. The passage slot 5c can be delimited by two outer peripheral edges opposite, and one of said outer peripheral edges can be formed by the periphery or the end 3b of the receiving surface 3a. The passage slot also makes it possible—during a shutdown of the liquid supply—to stop the diffusion of the droplets immediately by holding the liquid inside the secondary inner space 5b by capillary action, the capillary action generated essentially by the proximity to the peripheral edges of the passage slot 5c in the area of the lateral surface 5a of the fuselage. Upon resumption of the liquid supply, it actually makes it possible for droplets to be generated by centrifugal action in the area of the end 3b of the receiving surface 3a. In this first embodiment of the fuselage 5, the rotary atomizer 3 can have a pointed-arch or conical or truncated shape with an outer end face that can be located in a plane that is essentially perpendicular to the longitudinal axis X of the exhaust nozzle 1 and that can be rotated toward the inlet opening 1a of the exhaust nozzle 1. Such an outer end face can form the receiving surface 3a of the rotary atomizer.

In a second embodiment of the fuselage 5, as can be seen in FIG. 5, the receiving surface 3a of the rotary atomizer 3 can be located outside of the secondary inner space 5b. More particularly, the distal end of the fuselage 5 can end in an outer end face that extends into a plane that is essentially perpendicular to the longitudinal axis of the exhaust nozzle 1 and that is rotated toward the air outlet opening 1b. Such an outer end face can form the receiving surface 3a of the rotary atomizer 3 (FIG. 5). In this case, the secondary inner space 5b can be empty, partially empty, or full.

As can be seen in particular in FIGS. 3, 4a, 4b and 5, the fuselage 5 can comprise a lateral liquid supply extension 5d that can advantageously exhibit an aerodynamic profile and in which can be made a liquid supply channel that can form at least in part the main feed pipe 8. In addition, the lateral liquid supply extension 5d can extend transversely, preferably perpendicularly, to the longitudinal axis of the exhaust nozzle 1 in the annular channel for circulation of the stream of carrier air.

Figure 12:
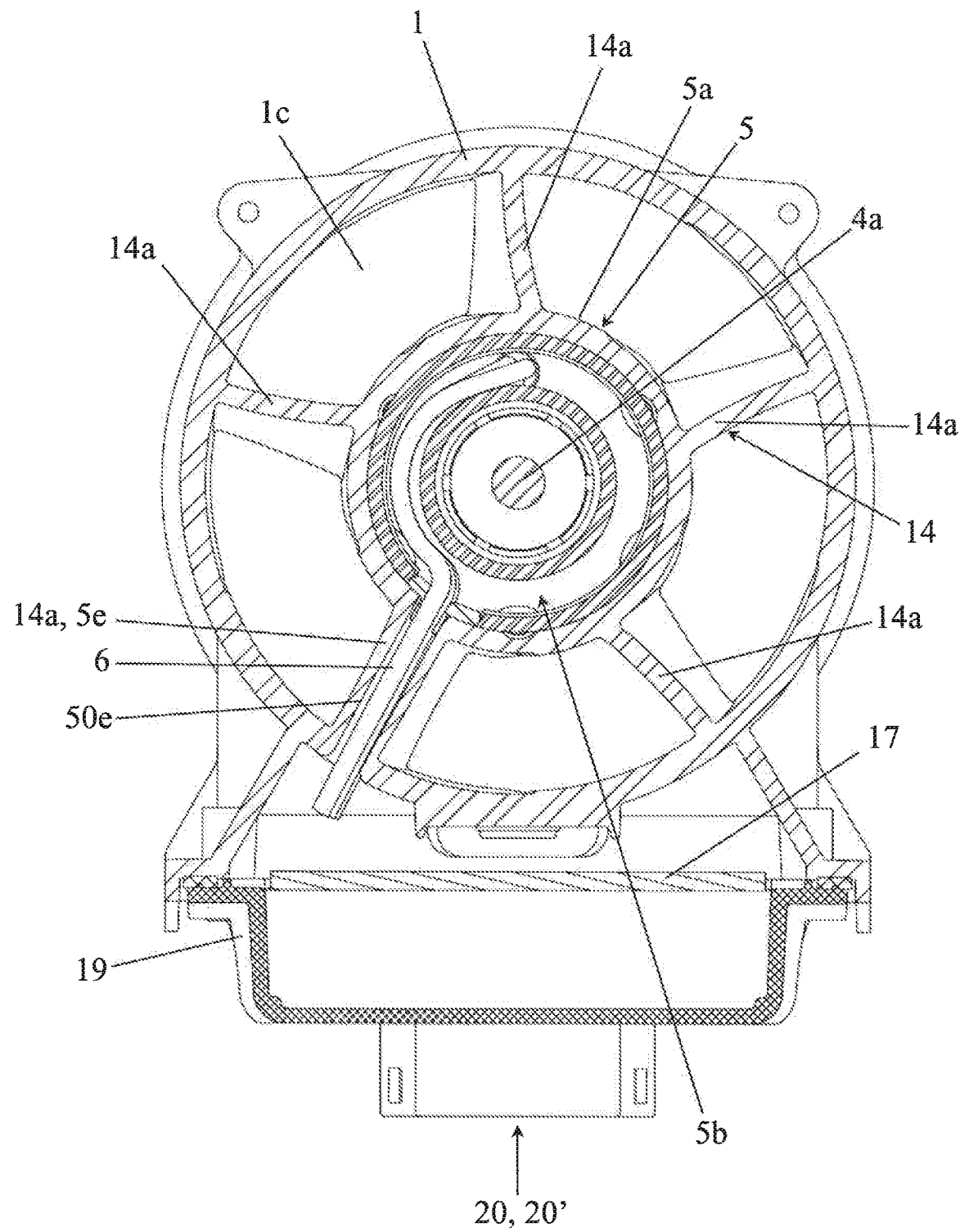
FIG. 12 shows a partial transverse cutaway view along A-A of the spraying unit shown in FIG. 2.

As can also be seen in FIG. 12, the spraying unit can also comprise electrical wires 6 that make it possible to supply the or each electric motor 4 with electric current, and the fuselage 5 can comprise a lateral electrical supply extension 5e that can advantageously exhibit an aerodynamic profile. In addition, the lateral electrical supply extension 5e can extend transversely, preferably perpendicularly, to the longitudinal axis X of the exhaust nozzle 1 and, through said extension, an electrical supply channel 50e that forms a passage for the electrical wires 6 can run into the annular channel for circulation of the stream of carrier air. In the case where the spraying unit comprises a lateral liquid supply extension 5d, the lateral electrical supply extension 5e can be provided in such a way as to be diametrically opposite to the lateral liquid supply extension 5d.

In contrast, if reference is made to FIGS. 2, 3, 4a, 4b, 5, it is possible to see that, in such a way as to be able to recover the stream of carrier air, having a helical shape at the outlet of the propeller 2a, in the axis of the exhaust nozzle 1 before its contact with the droplets, this invention can provide that the spraying unit can also comprise a recovery device 14 that extends into the annular channel for circulation of the stream of carrier air and that can be placed axially between the fan 2 and the rotary atomizer 3. Preferably, the recovery device 14 can be located close to the fan 2. Thus, owing to such a recovery device, it is possible to obtain—downstream from the latter—a stream of cohesive carrier air that is organized in terms of speed and direction essentially in the axis of the exhaust nozzle 1 in a non-laminar way to ensure a better energy yield before it makes contact with the droplets.

Such a recovery device 14 can comprise a number of recovery elements 14*a* such as blades, each blade 14*a* able to extend between two end edges, one of which can be attached to the fuselage 5, i.e., on the outer face of its lateral surface, or wall, 5*a*, and the other can be attached to the exhaust nozzle 1, i.e., on the inner face of the latter. The majority or all of the recovery elements 14 can be made of a single part, for example in a way combined with a part of the exhaust nozzle 1 and a part of the wall of the fuselage 5*a*.

In an advantageous embodiment, as can be seen in particular in FIG. 12, the recovery device 14 can comprise the lateral liquid supply extension 5*d* and/or the lateral electrical supply extension 5*e*. If necessary, as can be seen in this FIG. 12, one of the recovery elements 14*a* can comprise the lateral liquid supply extension 5*d* and/or the lateral electrical supply extension 5*e*.

Furthermore, if reference is made again to FIGS. 2, 3, 4*a*, 4*b*, 5, it is possible to see that the spraying unit can also comprise a diffuser device 15 that extends into the annular channel for circulation of the stream of carrier air and that the diffuser device 15 can be placed axially between the fan 2 and the rotary atomizer 3, preferably close to the receiving surface 3*a*.

In a preferred embodiment (FIGS. 2, 3, 4*a*, 4*b*, 5), the diffuser device 15 can comprise at least three diffuser elements 15*a*, 15*b*, one of which, so-called central diffuser 15*a*, can consist of a central hollow part with an overall cylindrical or truncated shape surrounding the fuselage 5, while the other diffuser elements, so-called lateral diffusers 15*b*, preferably two other diffuser elements, can each have an aerodynamic wing shape that extends transversely to the axis of said diffuser element 15*a* and can be attached to the outer lateral face of the central diffuser 15*a*, preferably by being distributed in a diametrically opposite way. Such a diffuser device 15 has the effect of organizing—in a way combined with the air outlet opening 1*b* of the exhaust nozzle 1—the mixture of droplets obtained from the rotary atomizer 3, in particular from its receiving surface 3*a* while preserving the characteristics of the stream of cohesive and non-linear carrier air obtained from the fan 2 and from the recovery device 14, and carrying them in a homogeneous way in the form of a brush in the area of the target (for example, vegetation).

The attachment and the holding of the diffuser device 15 can be carried out, preferably, by attaching it onto the inner face of the exhaust nozzle 1 and/or on the outer face of the fuselage 5 (FIGS. 2, 3, 4*a*, 4*b*, 5), for example by means of the diffuser elements 15*b* in wing form.

Such a spraying unit makes it possible to obtain an effective combination of the injection of droplets, preferably in a direction in a plane or a projection surface that is essentially vertical to the longitudinal axis X of the exhaust nozzle 1, in a stream of carrier air with a high and suitable speed. Actually, if the speed of the stream of carrier air is too low, a portion of the droplets can be projected onto the inner wall of the exhaust nozzle 1, which generates drainage and a loss of liquid at the target 21, and if the speed of the stream of carrier air is too high, the brush formed by the former at the outlet of the exhaust nozzle 1 is then too focused and narrow, which does not make possible a mixture of droplets in the entire air stream at the outlet of the exhaust nozzle 1. In this invention, the droplets are projected into the stream of carrier air inside the exhaust nozzle 1, i.e., in its main space 1*c*, in such a way that their diffusion in the stream of carrier air is not disrupted by the outside atmosphere in contrast to, for example, the system described in the document U.S. Pat. No. 6,152,382.

This invention also has as its object a compact spraying module for the spraying of a liquid in droplet form for the treatment of a target 21, such as, for example, a plant row.

In accordance with the invention, such a module, as can be seen in particular in FIGS. 1, 2, 8, 9 and 10, comprises:

- A spraying unit according to the invention as described above,
- Its own liquid supply system 7, 11, functionally connected to the transporting means 8, 9 of said spraying unit, with said supply system comprising an electric pump 11 that makes it possible to push back, with a controlled variable flow rate, the liquid, coming from a reservoir 26, into said transporting means and a hydraulic connection interface 7 that makes it possible for said system to receive the liquid coming from the reservoir 26,
- A support 10 that makes it possible to keep the electric pump 11 steady close to the spraying unit,
- An electronic control and/or monitoring unit 17, for example implanted on an electronic card, making it possible to control and/or to monitor the operation of the drive system 4, 4*a* and the liquid supply system by being functionally connected to said drive and liquid supply systems,
- An electrical connection interface 20' making possible the connection of the drive system 4, 4*a*, the liquid supply system, in particular the electric pump 11 and the electronic control and/or monitoring unit 17, to an electrical energy source 22 to ensure their electrical supply.

The reservoir 26 is preferably located outside of and at some distance from the module, for example by being mounted on a machine or a movable unit 23 supporting at least one module according to the invention (FIG. 10).

The spraying unit, more particularly by means of the nozzle 1, can be attached to the support 10. Such a support 10 can be made of two parts, for example, semi-cylindrical overall, assembled one to the next in such a way as to allow easy assembly and disassembly of the support 10 and parts of the attached modules, if necessary in a removable manner, with the latter.

The electric pump 11, if necessary combined with a flow rate sensor, is able to deliver, under the control and/or the monitoring of the electronic control and monitoring unit 17, via the transporting means 8, 9, a controlled variable flow rate in the area of the rotary atomizer 3 and can preferably consist of a volumetric pump, more preferably a peristaltic pump. The advantages of a volumetric pump, and in particular of a peristaltic pump, are to deliver a precise liquid flow rate depending on the speed of rotation of the pump under a pressure that is slightly different or essentially equal to the atmospheric pressure and without the assistance of a flow rate sensor. Thus, the halting of instantaneous rotation of the pump does not generate residual pressure in the downstream circuit, thus avoiding the inadvertent dripping of liquid in the area of the rotary atomizer 3. Likewise, the precision obtained by this type of pump avoids positioning an additional flow rate sensor in the supply system. And finally, the possible rotation speed range of the pump actually brings about the possibility of varying its flow rate in a significant range. In this case, a flow rate set point can be provided to the peristaltic pump by software, or an operator, and can be translated directly into a rotation speed set point of the peristaltic pump.

If reference is made to FIG. 11, it is possible to see that the electronic control and/or monitoring unit 17 can comprise a microprocessor and a memory that can contain codes that are representative of the spraying parameters to be adjusted and/or an identification code of said module, as well as a bus for internal communication with the elements of the module (liquid supply system, drive system with electric motor, . . . ).

The microprocessor of the control and monitoring unit 17 can be provided for the purpose of determining at least one of the following pieces of monitoring information:

Temperature information and/or current/voltage information and/or speed information pertaining to the operation of the drive system with an electric motor 4, 4a (fan and/or rotary atomizer), Temperature information and/or current/voltage information and/or speed information pertaining to the operation of the electric pump 11, Information pertaining to the identification code 1d of said spraying module.

The microprocessor can also be provided for the purpose of receiving from the electronic central control unit 13 at least one of the following pieces of set-point information:

Set-point information pertaining to the operation of the drive system 4, 4a,

Set-point information pertaining to the operation of the electric pump 11.

Figure 10:
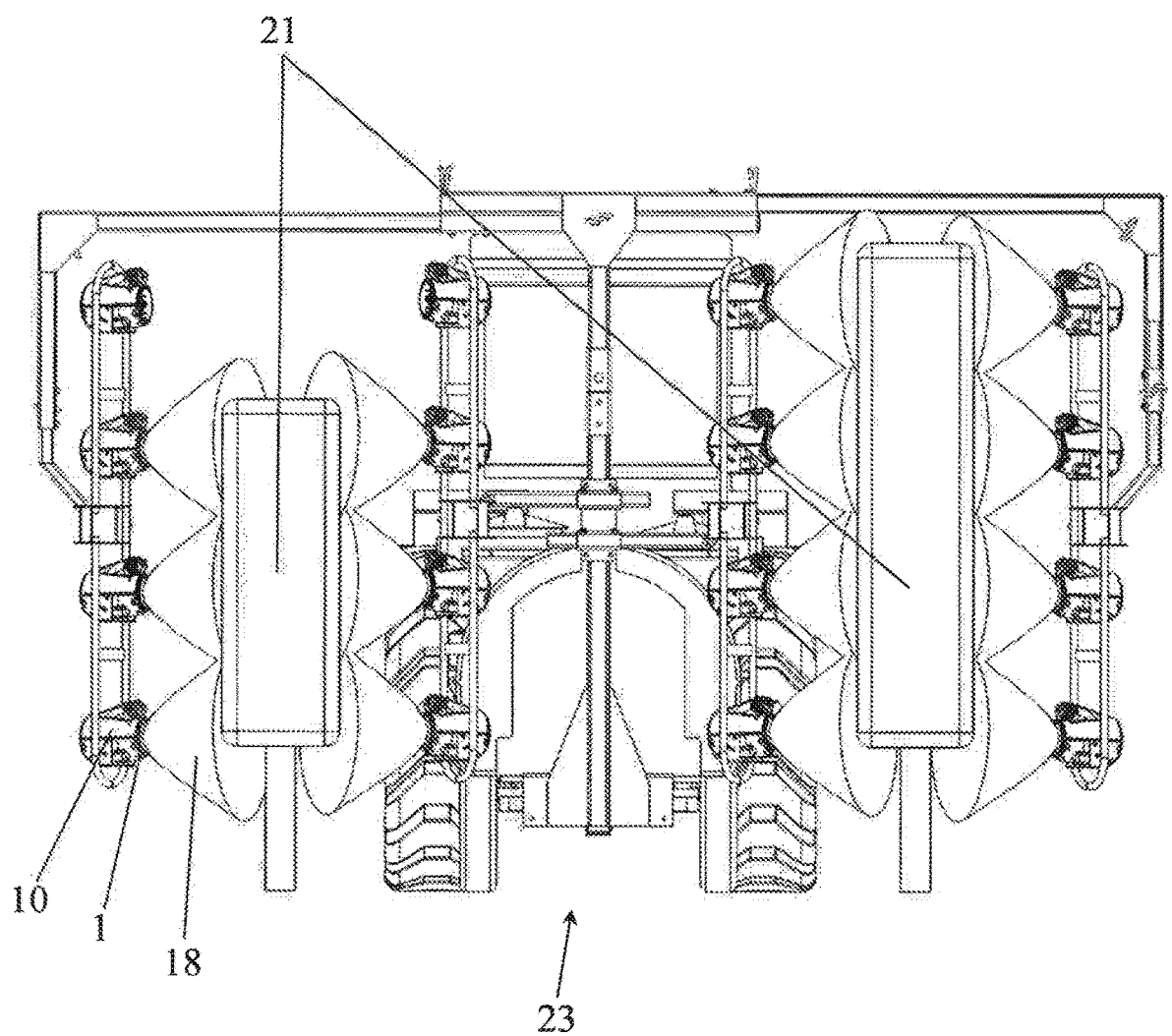
FIG. 10 shows a rear view of a movable unit that carries a number of modules, carried by ramps, of a spraying and control system according to the invention.

In a preferred use and in a preferred embodiment of such a module, the former can be provided for the purpose of being connected in a spraying and control system comprising a number of spraying modules and a control panel 16 (FIGS. 10, 11). For this purpose, the module can also comprise an individual communication interface 20 that makes it possible to connect the electronic control and/or monitoring unit 17 to the control panel 16 by means of a communication bus 25, so as to make possible, starting from the latter, the individual remote control of said module, independently of other modules, to be able to adapt instantaneously at least one spraying parameter.

The connecting means 6, able to comprise electrical wires, can be provided functionally to connect the electronic control and/or electric monitoring unit 17, the drive system 4, 4a, and the electric pump 11, by means of the electric connecting interface 20', to the electrical energy source 22 by means of an electric network 30. In contrast, such connecting means 6 can also comprise electrical wires that make it possible functionally to connect the electronic control and/or monitoring unit 17, by means of the individual communication interface 20, to the control panel 16. Preferably, as can be seen in FIGS. 1, 2, 9 and 12, the electric connecting interface 20' and the individual communication interface 20 can be located at the same point in the module that comes, for example, in the form of a multi-path connector.

The individual communication interface 20 can also be provided for the purpose of comprising a radiofrequency transmission circuit that makes possible the transmission by radiofrequency means of the communication signals that are necessary to the operation of the module.

The spraying module according to the invention can comprise a housing 19, for example in the form of a box, adapted to accommodate and protect the electronic control and/or monitoring unit 17 and, if necessary, the communication interface. In addition, the housing 19 can be mounted on the exhaust nozzle 1 or integrated therein (see in particular FIGS. 1, 2, 3, 4a, 4b, 5, 12).

The spraying module according to the invention can also comprise a casing that can accommodate and protect the spraying unit. In contrast, such a casing can also be provided for the purpose of forming the support 10 for the electronic pump 11 (FIGS. 1, 2, 8, 9, 10).

If reference is made in particular to FIGS. 1, 2, 3, 4a, 4b, 5, it is possible to see that the casing 10 can be attached to, for example, the exhaust nozzle 1, for example by ratcheting or encasing. For this purpose, the casing 10 can have an overall cylindrical shape whose open ends each comprise an overall circular or oval inner rib 10a, and the exhaust nozzle 1 can comprise at each of its ends an overall circular or oval groove 1d that is suitable for accommodating—by ratcheting or encasing—one of the inner ribs 10a. The casing 10 can be made of two half-shells. The two half-shells can also be connected to one another by screwing.

If reference is now made to FIGS. 10 and 11, it is possible to see that the invention also has as its object a spraying and control system designed to be installed on board a machine or a movable unit 23, with said system comprising a number of spraying modules for the spraying of a liquid in droplet form 18 for the treatment of a target such as, for example, a plant row 21, with said liquid coming from a reservoir.

In accordance with this invention, such a spraying and control system also comprises a control panel 16 that comprises an electronic central control unit 13 and a man-machine interface 16a, so-called MMI, connected to the latter, with each spraying module consisting of a compact spraying module as defined according to this invention.

Still in accordance with this invention, the electronic central control unit 13 is functionally connected to each spraying module in such a way as to allow remote individual control of each spraying module, independently of the other spraying module(s), from said control panel to adjust individually the spraying and operating parameters of each spraying module.

Among the spraying parameters, the invention can provide, for example:

The flow rate of liquid transformed into droplets by the rotary atomizer 3 during the rotation of its receiving surface 3*a*, The size of the droplets, The speed of the stream of carrier air that carries said droplets to the target.

The MMI 16*a* can comprise a display screen 160*a* that is provided for the purpose of displaying in a visual manner at least one of the pieces of monitoring information and/or at least one of the pieces of set-point information as defined above, for the purpose of being able to monitor and track over real time the operation of each spraying module directly from the control panel 16. For example, such a display screen makes it possible to display the air speeds and the quantity of liquid sprayed by the spraying modules.

The MMI 16*a* can also comprise peripherals 160*b* such as a joystick and/or push buttons that make it possible for the user to carry out various commands, adjustments or checks of the system, for example the adjustment of a manual or automatic mode of the system, the adjustment of the flow rate of liquid to be sprayed from some spray module or other that is selected or else the adjustment of the width of the row by selecting—based on this width—the number of spray modules to be started up.

More particularly, the central control unit 13 and the electronic control and/or monitoring unit 17 of each module can be configured to be able to adapt, in an instantaneous way, on the one hand, the quantity of droplets and the flow rate of the electric pump 11 by controlling the operation of the latter, and, on the other hand, the size of the droplets and/or the speed of the latter and/or the speed of air exiting the exhaust nozzle 1 by controlling and monitoring the operation of the drive system 4, 4*a* to adjust the speed of rotation of the receiving surface 3*a* of the atomizer 3 and/or the speed of rotation of the propeller 2*a* of the fan 2. This makes it possible in particular to adapt the spraying parameters of the liquid, such as the pulp, both based on the target, such as the vegetation, encountered in the direction of movement of the machine or of the movable unit 23 carrying such a module, but also, at a given instant, along a spraying ramp that comprises several modules according to the target that is positioned opposite each module. At each instant, the adjustment of the liquid spraying parameters makes possible either the instantaneous halting of one of the parameters of the module (immediate for the pump, on the order of one to two seconds for the propeller), or the instantaneous initiation of at least one of these parameters (less than one second for restarting the propeller and for generating the desired stream of carrier air, instantaneous starting of the pump at the desired speed of rotation and therefore at the desired flow rate) in such a way as to create at the target a homogeneous treatment brush, with the brushes of each module being very lightly covered to ensure the treatment of the entire plant cover opposite the ramp of modules.

In such a spraying system, the electronic control and/or monitoring unit 17 of each module can be adapted to monitor and/or control the drive system 4, 4*a* with electric motor(s) and the electric pump 11 from control signals that are sent, via the central unit 13 via the communication interface, to the individual electronic control and/or monitoring unit 17 in question (FIG. 11).

Such a spraying and control system can be equipped with at least one spraying ramp forming a support that is integral with the machine or the movable unit 23 and being provided for the purpose of carrying a number of modules (FIGS. 8 and 10).

In contrast, as can be seen in FIG. 11, such a spraying and control system according to this invention can comprise a central communication bus 25 that makes it possible functionally to connect each spraying module to the central unit 13.

As can also be seen in FIG. 11, such a spraying and control system can also comprise a detection system 24 that is functionally connected to the central unit 13, if necessary by means of the central communication bus 25 or by radiofrequency. The detection system 24 can be adapted to detect an absence or a presence of the target 21 and/or a target profile and to transmit to the central unit 13 a piece of information pertaining to said detection in such a way as to carry out the individual control of each spraying module based on said detected information.

In such a spraying system, the central unit 13 can comprise a communication bridge that is functionally connected to the central communication bus 25, and each spraying module can be functionally connected to the latter in such a way as to allow the central unit 13 to remotely control individually each spraying module via said central communication bus 25.

More particularly, the detection system 24 can comprise presence detection means 24*a*, such as, for example, one or more ultrasound sensors, infrared sensors, laser sensors . . . making it possible to detect the presence or the absence of the target 21 and being adapted to transmit to the central unit 13*a* signal that is representative of this detection, with said central unit 13 being adapted to control—based on this detection—at least one of the spraying modules by controlling and monitoring either the starting-up or the halting of the operation of its own electric pump 11 and/or its drive system 4, 4*a*. It can also comprise target profile detection means 24*b* that make it possible to detect a physical magnitude providing information on the profile of the target 21, such as its surface or its density, and being adapted to transmit to the central unit 13 a signal that is representative of this information, with said central unit 13 being adapted to control individually each spraying module based on this information by controlling and by monitoring the operation of the electric pump 11 to adjust the flow rate of the liquid that supplies the rotary atomizer 3 and/or the operation of the drive system 4, 4*a* to adjust the speed of the air stream and/or the operation of the rotary atomizer 3 to adjust the size of the droplets and/or the speed of the air stream.

The detection system 24 can comprise both such presence detection means and such target profile detection means.

Thus, such a spraying unit or such a module or such a spraying system, according to the invention, makes it possible to spray, starting from one or more spraying units or modules, in a dynamic way, a liquid in the form of droplets 18 of a size and quantity that are adapted and mixed with a stream of undisrupted carrier air that can sweep the target, in particular the vegetation, located at some distance, opposite the air outlet opening, in the form of a homogeneous liquid droplet brush. The size and the quantity of droplets can thus be adapted based on the nature of the sprayed liquid, the volume of the plants to be treated, the age and type of vegetation located in the treatment brush of the module, while limiting the projections outside of the vegetation to be treated and without a structural modification of the module by passing from one type of vegetation to the next or from one treatment product to the next. The liquid flow rate, the size of the droplets, and the speed of the stream of carrier air can thus be modified in an instantaneous way, at some distance, and, if necessary, in a way that is different from one module to the next in a system according to the invention, without direct human intervention on the module, the modifications being controlled remotely and in an instantaneous way by the operator of the machine or in an automatic way.

Such a system makes it possible to reduce to the maximum the quantity of product (the liquid) applied on the target 21, such as a vine, by distributing it essentially over the latter, and it makes it possible, for example, to provide, for example, at least one of the following functionalities and advantages:

- Adjustment of the spraying parameters on the control panel 16 from the cabin of the movable unit 23, eliminating contact between the user and the phytosanitary product (liquid),
- Adjustment on the control panel 16 of the target type, the row width as well as the theoretical flow rate of the product to be sprayed per surface unit and/or selection of the product to be sprayed, with the system having in memory approved doses of this product,
- Adjustment of the flow rate and the row width on the control panel 16 for the purpose of modifying automatically the spraying parameters during treatment,
- Variations of the flow rate of the electric pump 11 proportionally to the speed of advance of the movable unit 23,
- Instantaneous manual and/or automatic adjustment of the flow rate, the air speed, or the size of droplets on each spraying module so as to optimize the application of the liquid 18 on the target 21,
- Automatic detection of the target so as to trigger and to halt the spraying when the system detects the target 21

(for example, vegetation) at the beginning of the row or in the middle of the row or no longer detects the target 21 in the middle of the row or at the end of the row, Making it possible for the user to correlate the information displayed on the control panel 16 with the quantity of liquid 18 (pulp) prepared at the beginning of treatment so as to verify that the proper quantity of product has been applied to the target, Monitoring and tracking in real time the spraying and control system making it possible to know, for example, the electrical consumption of each spraying module, the speed of rotation of each electric pump 11, the verification in real time of the communication between the control panel 16 and the spraying modules, Making it possible to diagnose the system from the control panel 16 and therefore, for example, from the cabin of the movable unit 23 where said panel is found, as well as the operation before and during the treatment so as to immediately decelerate any malfunction that can affect the quality of treatment, Simplifying the calibration of the electric pumps 11 of each module, in such a way as to make it possible that each electric pump 11 is adjusted as precisely as possible by applying a correction factor to the electric pump 11 directly from the control panel 16.

The electronic central control unit 13 of the control panel 16, which can comprise a microprocessor, can be provided for the purpose of being controlled automatically by a program or software. In contrast, the electronic control and monitoring unit 17 of each module, and in particular the microprocessor of each module, can be provided for the purpose of being controlled automatically by a program or software. In addition, the electronic central control unit 13 and/or the control unit and each electronic control and monitoring unit 17 can be provided for the purpose of allowing a daily update of the programs or software. Such an update of the program or software stored in a memory of the electronic central control unit 13 can be carried out from the control panel 16. The update of the program or software recorded in a memory of the electronic control and monitoring unit 17 of each module can be carried out directly in the latter or from the control panel 16 via the corresponding communication interface 20.

It will be understood that the operations carried out by the spraying modules can be controlled manually by the operator from the control panel 16 or, if necessary, automatically by the program or software provided for this purpose and that can be activated automatically, for example, following detection by the above-mentioned detection means.

Of course, the invention is not limited to the methods or embodiments described and shown in the accompanying drawings. Modifications are possible, in particular from the standpoint of the composition of the various elements or by substitution of equivalent techniques, without thereby exceeding the scope of protection of the invention.

The invention claimed is:

1. A spraying unit for the spraying of a liquid in droplet form for the treatment of a target, the spraying unit comprising:
    an exhaust nozzle formed by a pipe that extends along a longitudinal axis by delimiting on the inside a main inner space and being open at ends thereof to form an air inlet opening and an air outlet opening, the main inner space accommodating
        at least one rotary atomizer mounted in rotation around a first axis of rotation,
        a transport system configured to transport the liquid, coming from a supply system with a controlled variable flow rate, up to the rotary atomizer,
        a fan that comprises at least one propeller mounted in rotation around a second axis of rotation enabling generation of a stream of carrier air in the main inner space toward and beyond the air outlet opening, and
        an electric motor drive system enabling driving in rotation of said rotary atomizer and the at least one propeller,
        said rotary atomizer comprising
            a receiving surface configured to receive the liquid and configured to, on a periphery thereof or an end thereof, in a state of rotation of said rotary atomizer, break up the liquid into droplets and propel the droplets into the stream of carrier air and not onto an inner wall of the exhaust nozzle, the receiving surface of the rotary atomizer exclusively breaking up the liquid into the droplets, and
            a connector configured to connect to an electrical energy generator to provide electrical energy to the drive system; and
    an inner fuselage that has an aerodynamic profile defined by a lateral surface delimiting on the inside a secondary inner space and being kept axially in the main inner space between the fan and the air outlet opening to define, between the fuselage and the exhaust nozzle, an annular channel for circulation of the stream of carrier air surrounding said fuselage, the fuselage comprising a rotary section that is formed by the rotary atomizer such that the periphery or the end of the receiving surface essentially is part of the lateral surface of the fuselage while enabling the rotation of the rotary atomizer and the propulsion, essentially perpendicular to the longitudinal axis, of the droplets in said channel to be incorporated in the air stream.

2. The spraying unit according to claim 1, wherein the respective first and second axes of rotation of the rotary atomizer and the propeller are essentially combined or combined with one another, with the longitudinal axis of the exhaust nozzle.

3. The spraying unit according to claim 1, wherein the drive system is housed in the secondary inner space of the fuselage.

4. The spraying unit according to claim 1, wherein the drive system comprises at least one electric motor and at least one drive shaft that enables the driving in rotation of the rotary atomizer around the first axis of rotation and the driving in rotation of the propeller around the second axis of rotation.

5. The spraying unit according to claim 4, wherein the drive system comprises a single common electric motor and a single common drive shaft that is actuated in rotation around its axis by said electric motor, said common electric motor and said common drive shaft enabling both the rotation of the propeller around the second axis of rotation and the rotation of the rotary atomizer around the first axis of rotation, said first and second axes of rotation being combined.

6. The spraying unit according to claim 4, wherein the fuselage comprises at least one cooling section that surrounds the at least one electric motor and that is in contact with the stream of carrier air to evacuate by said contact a portion of the heat that is generated by the at least one electric motor, said section being aluminum.

7. The spraying unit according to claim 4, wherein the rotary atomizer is pierced centrally and axially by a bore configured to enable passage of the drive shaft to enable rotation of the drive shaft around the first axis of rotation via a drive connection.

8. The spraying unit according to claim 4, wherein the transport system comprises a main feed pipe configured to receive the liquid coming from a liquid supply system and configured to supply, directly or indirectly, at at least one supply point, the rotary receiving surface, and wherein the fuselage comprises a lateral liquid supply extension that has an aerodynamic profile and in which at least a portion of the main feed pipe that is integrated or connected in said extension runs, the extension extending transversely to the longitudinal axis of the exhaust nozzle in the annular channel for circulation of the stream of carrier air.

9. The spraying unit according to claim 8, wherein the main feed pipe is configured to indirectly supply the receiving surface with the liquid, the transport system comprises at least two secondary feed pipes each configured to be connected to said main feed pipe and disposed in the secondary inner space of the fuselage, the spraying unit further comprising an intermediate part for supply and distribution that comprises the at least two secondary feed pipes and that is placed in the secondary inner space of the fuselage between the fan and the rotary atomizer, in immediate proximity to the rotary atomizer such that each of the secondary feed pipes emerges separately from the stream of carrier air facing the stream of carrier air and in immediate proximity to the rotary receiving surface to supply the rotary receiving surface with the liquid at at least two supply points, distributed on both sides of the first axis of rotation to ensure the rotation of the receiving surface around said first axis of rotation.

10. The spraying unit according to claim 9, wherein the intermediate supply and distribution part comprises an annular groove for distribution of the liquid, the annular groove comprising at least two openings that each emerge into one of the secondary feed pipes, and wherein the main feed pipe emerges at the annular groove that thus ensures the distribution of the liquid, transported from the electric pump via the main feed pipe, into the secondary feed pipes.

11. The spraying unit according to claim 10, wherein the intermediate supply and distribution part has an overall cylindrical shape and is pierced at one end face thereof, rotated toward the air inlet or outlet opening of the exhaust nozzle, by at least two feed holes respectively forming the liquid supply points, the annular distribution groove being defined in the outer lateral face of said supply and distribution part, and the secondary feed pipes being made of the same material as the intermediate supply and distribution part to emerge at one of their ends into the annular groove and at their other end into one of said feed holes, and wherein the fuselage is configured to receive said intermediate supply and distribution part to surround said annular groove by ensuring a fluid sealing with the annular groove.

12. The spraying unit according to claim 9, wherein the intermediate supply and distribution part defines a passage bore that allows the passage of the drive shaft, which drives in rotation the rotary atomizer and runs axially through the intermediate supply and distribution part.

13. The spraying unit according to claim 4, further comprising electrical wires configured to supply the at least one electric motor with electric current, wherein the fuselage comprises a lateral electrical supply extension that has an aerodynamic profile and that extends transversely to the longitudinal axis of the exhaust nozzle and, through said extension, an electrical supply channel that forms a passage for said electrical wires passing into the annular channel for circulation of the stream of carrier air.

14. The spraying unit according to claim 1, wherein the receiving surface of the rotary atomizer extends in a plane that is essentially perpendicular to the longitudinal axis of the exhaust nozzle.

15. The spraying unit according to claim 14, wherein the rotary atomizer is shaped as a disk or a truncated or conical part, and one of outer faces of the disk or the truncated or conical part forms the receiving surface.

16. The spraying unit according to claim 1, wherein the fuselage comprises two ends, including a distal end that is farthest from the fan, and wherein the rotary section of the fuselage forms said distal end.

17. The spraying unit according to claim 16, wherein the distal end of the fuselage ends in an outer end face that extends into a plane that is essentially perpendicular to the longitudinal axis of the exhaust nozzle and that is rotated toward the air outlet opening, said outer end face forming the receiving surface of the rotary atomizer.

18. The spraying unit according to claim 1, wherein the receiving surface of the rotary atomizer is located in the secondary inner space and the axial or longitudinal continuity of the lateral surface of the fuselage is interrupted by a transverse passage slot configured to propel the droplets into the stream of carrier air through the lateral surface of the fuselage, said passage slot being delimited by two opposite outer peripheral edges, one of the outer peripheral edges being formed by the periphery or the end of the receiving surface.

19. The spraying unit according to claim 1, wherein the fuselage comprises a lateral liquid supply extension that has an aerodynamic profile and in which is defined a liquid supply channel that forms at least in part the main feed pipe, said extension extending transversely to the longitudinal axis of the exhaust nozzle in the annular channel for circulation of the stream of carrier air.

20. The spraying unit according to claim 19, further comprising a recovery device that extends into the annular channel for circulation of the stream of carrier air and that is disposed axially between the fan and the rotary atomizer to be able to recover the stream of carrier air before the stream of carrier air makes contact with the droplets, said recovery device being located close to the fan.

21. The spraying unit according to claim 20, wherein the recovery device comprises a plurality of recovery elements including blades, each blade extending between two end edges, one of the end edges attached to the fuselage and the other one of the end edges being attached to the exhaust nozzle.

22. The spraying unit according to claim 20, wherein the recovery device is formed by the lateral liquid supply extension.

23. The spraying unit according to claim 1, further comprising a diffuser device extending into the annular channel for circulation of the stream of carrier air, said diffuser device being disposed axially between the fan and the rotary atomizer, close to the receiving surface of the rotary atomizer.

24. The spraying unit according to claim 23, wherein the diffuser device comprises three diffuser elements, one of the three diffuser elements comprising a central hollow part with a truncated shape, the other two diffuser elements each having an aerodynamic wing shape that extends transversely to the axis of said truncated diffuser element and each being attached to the outer face for rotating the outer face, by being distributed in a diametrically opposite way, with said wing-shaped diffuser elements being attached to the exhaust nozzle.

25. The spraying unit according to claim 1, wherein the air outlet opening has an oval shape.

26. A compact spraying module for the spraying of a liquid in droplet form for the treatment of a target, the compact spraying module comprising:
the spraying unit according to claim 1;
a liquid supply system functionally connected to the transport system of said spraying unit, said liquid supply system comprising an electric pump configured to push back, with a controlled variable flow rate, the liquid, coming from a reservoir, into said transport system, and a hydraulic connection interface enabling said supply system to receive the liquid coming from the reservoir;
a support configured to keep the electric pump steady close to the spraying unit;
an electronic control and/or monitoring system configured to control and/or monitor the operation of the drive system and the liquid supply system, with electronic control and/or monitoring system being functionally connected to said liquid supply and drive systems; and
an electrical connection interface configured to connect the drive system, the electronic control and/or monitoring system, and the liquid supply system to an electrical energy generator to ensure their electrical supply.

27. The compact spraying module according to claim 26, wherein the compact spraying module is configured to be connected in a spraying and control system that comprises a plurality of compact spraying modules, a control panel, and a communication interface configured to connect the electronic control and/or monitoring system to the control panel to enable remote individual control of said spraying module, independently of other spraying modules, to be able to adapt at least one spraying parameter instantaneously.

28. The compact spraying module according to claim 27, further comprising a housing configured to accommodate the electronic control and/or monitoring system and the communication interface, and said housing being mounted on the exhaust nozzle or integrated in the exhaust nozzle.

29. A spraying and control system configured to be installed on board a machine or a movable unit, the spraying and control system comprising:
a plurality of compact spraying modules configured to spray a liquid in the form of droplets for treatment of a target, said liquid coming from a reservoir; and
a control panel comprising an electronic central controller and a man-machine interface connected to the electronic central controller,
wherein each compact spraying module consists of the compact spraying module according to claim 27,
wherein the electronic central controller is functionally connected to each of the spraying modules to allow remote individual control of each of the spraying modules, independently of the other spraying modules, from said control panel to individually adjust spraying and operating parameters of each of the spraying modules.

30. The compact spraying module according to claim 26, further comprising a casing that protects the spraying unit and that forms the support for the electronic pump.

* * * * *